United States Patent
Grangetto et al.

(10) Patent No.: US 10,051,286 B2
(45) Date of Patent: Aug. 14, 2018

(54) METHOD FOR GENERATING AND RECONSTRUCTING A THREE-DIMENSIONAL VIDEO STREAM, BASED ON THE USE OF THE OCCLUSION MAP, AND CORRESPONDING GENERATING AND RECONSTRUCTING DEVICE

(71) Applicant: S.I.SV.EL SOCIETA' ITALIANA PER LO SVILUPPO DELL'ELETTRONICA S.P.A., None (TO) (IT)

(72) Inventors: Marco Grangetto, Pinerolo (IT); Maurizio Lucenteforte, Turin (IT)

(73) Assignee: S.I.SV.EL SOCIETA' ITALIANA PER LO SVILUPPO DELL'ELETTRONICA S.P.A., None (TO) (IT)

( * ) Notice: Subject to any disclaimer, the term of this patent is extended or adjusted under 35 U.S.C. 154(b) by 607 days.

(21) Appl. No.: 14/396,339

(22) PCT Filed: May 7, 2013

(86) PCT No.: PCT/IB2013/053660
§ 371 (c)(1),
(2) Date: Oct. 22, 2014

(87) PCT Pub. No.: WO2013/168091
PCT Pub. Date: Nov. 14, 2013

(65) Prior Publication Data
US 2015/0092845 A1    Apr. 2, 2015

(30) Foreign Application Priority Data
May 8, 2012  (IT) .............................. TO2012A0413

(51) Int. Cl.
*H04N 19/597* (2014.01)
*H04N 13/00* (2018.01)
(Continued)

(52) U.S. Cl.
CPC ....... *H04N 19/597* (2014.11); *H04N 13/0022* (2013.01); *H04N 13/0048* (2013.01);
(Continued)

(58) Field of Classification Search
CPC .................................................... H04N 19/553
See application file for complete search history.

(56) References Cited

U.S. PATENT DOCUMENTS

2010/0195716 A1   8/2010  Gunnewiek et al.
2011/0064299 A1*  3/2011  Zhang ........................ G06T 7/55
                                                                    382/154
(Continued)

FOREIGN PATENT DOCUMENTS

EP    2 432 232 A1    3/2012
WO    2012/036901 A1  3/2012

OTHER PUBLICATIONS

International Preliminary Report on Patentability and Written Opinion dated Nov. 11, 2014, issued in PCT Application No. PCT/IB2013/053660, filed May 7, 2013.
(Continued)

*Primary Examiner* — Anner N Holder
*Assistant Examiner* — Hesham K Abouzahra
(74) *Attorney, Agent, or Firm* — Workman Nydegger

(57) ABSTRACT

Devices and methods for generating a three-dimensional video stream starting from a sequence of video images. The sequence includes a first view ($V_0$), at least one second view ($V_1$) of a scene, and a depth map ($D_0$) of said first view ($V_0$), or a disparity map of said at least one second view ($V_1$) with respect to the first view ($V_0$). At least one occlusion image
(Continued)

($O_1$) including the occluded pixels of said second view ($V_1$) is obtained by starting from said depth map ($D_0$) or from said disparity map. A compacted occlusion image ($OC_1$) is generated by spatially repositioning said occluded pixels of said at least one occlusion image ($O_1$), so as to move said pixels closer to one another. The three-dimensional video stream may include said first view ($V_0$), said depth map ($D_0$) or said disparity map, and said at least one compacted occlusion image ($OC_1$).

23 Claims, 24 Drawing Sheets

(51) Int. Cl.
*H04N 19/547* (2014.01)
*H04N 19/553* (2014.01)

(52) U.S. Cl.
CPC ......... *H04N 19/547* (2014.11); *H04N 19/553* (2014.11); *H04N 2013/0081* (2013.01)

(56) References Cited

U.S. PATENT DOCUMENTS

| | | | |
|---|---|---|---|
| 2011/0211083 A1* | 9/2011 | Petrides | G06T 5/005 348/208.4 |
| 2012/0039528 A1 | 2/2012 | Lee et al. | |
| 2013/0162773 A1* | 6/2013 | Tian | H04N 19/597 348/43 |

OTHER PUBLICATIONS

International Search Report dated Jul. 19, 2013, issued in PCT Application No. PCT/IB2013/053660, filed May 7, 2013.

\* cited by examiner

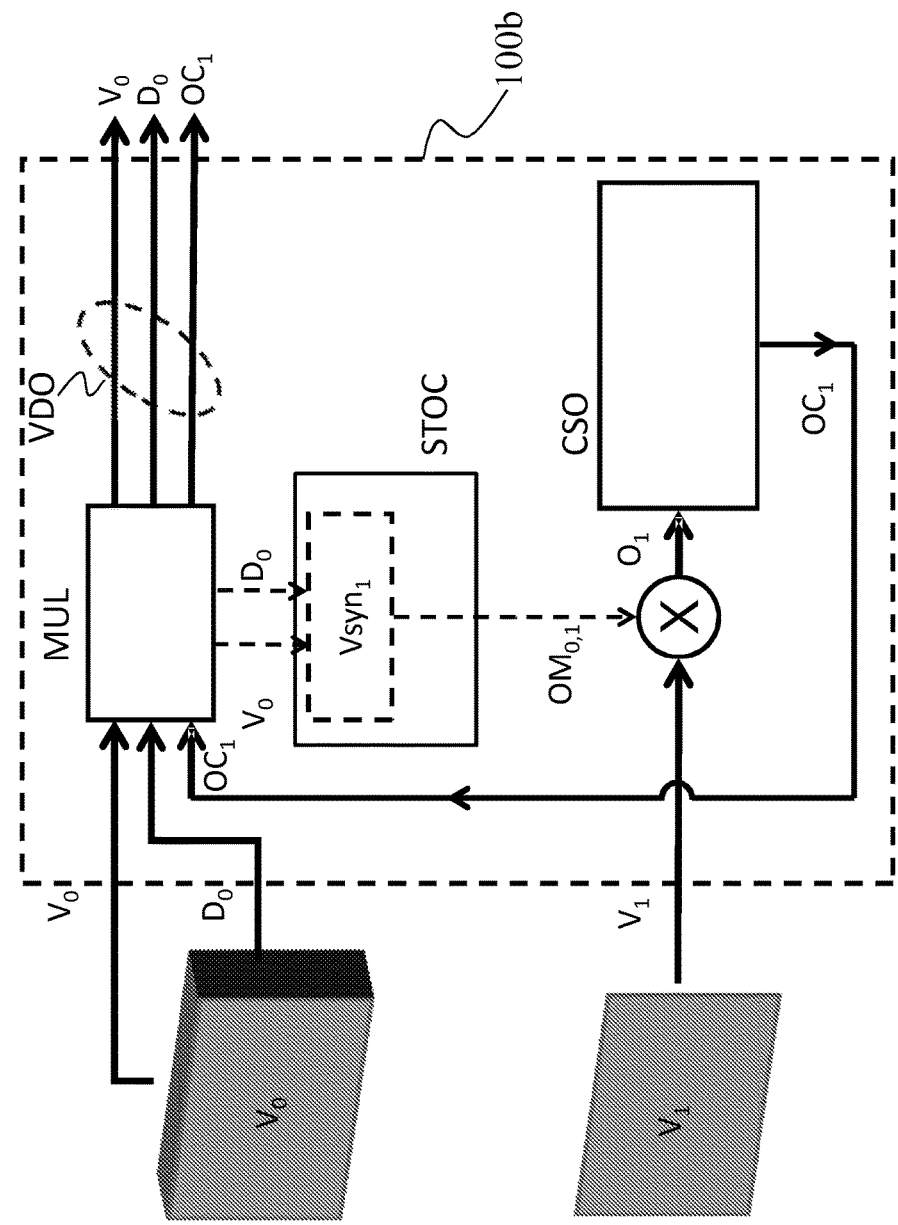
Fig. 1bis

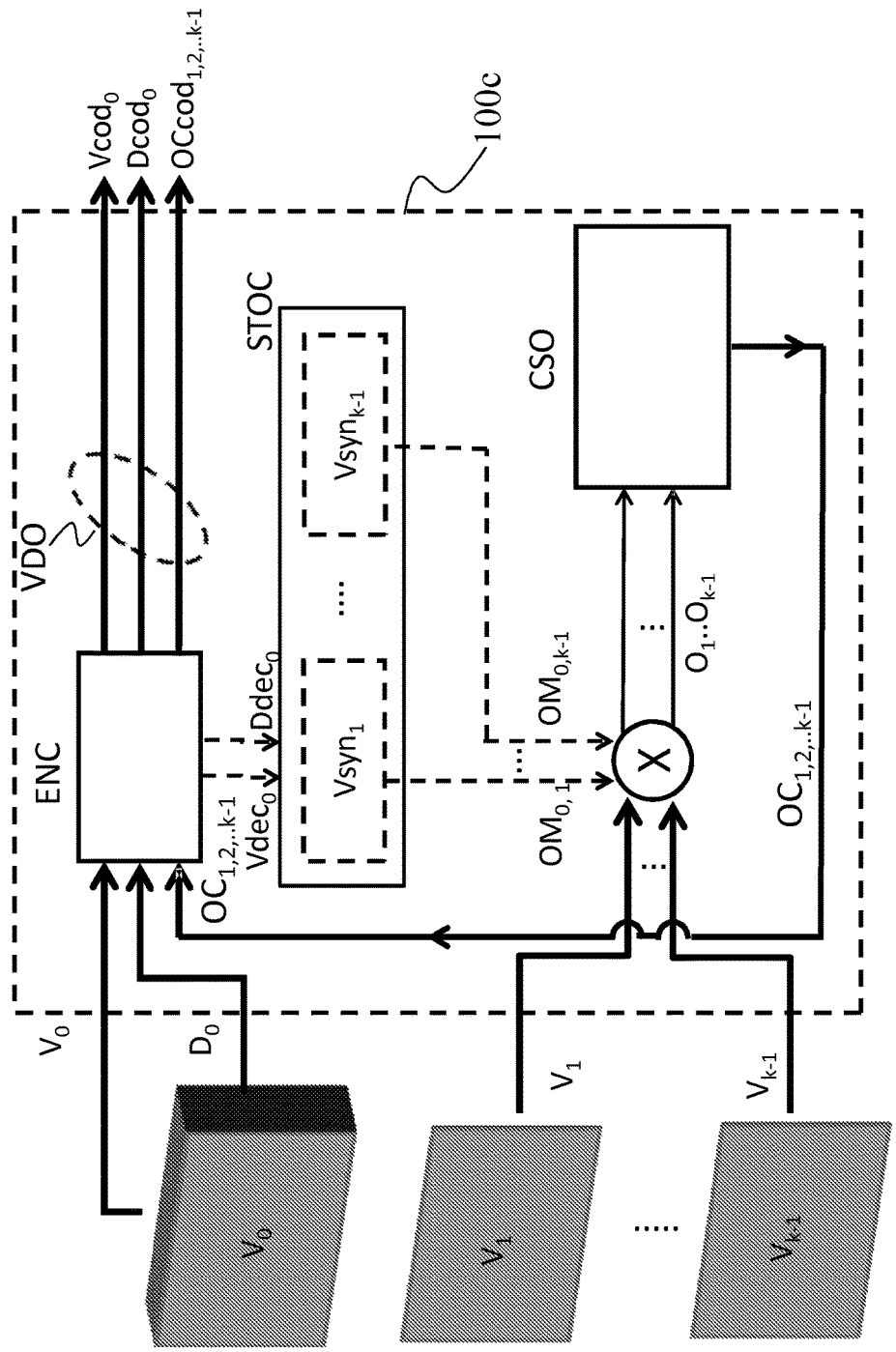
Fig. 1ter

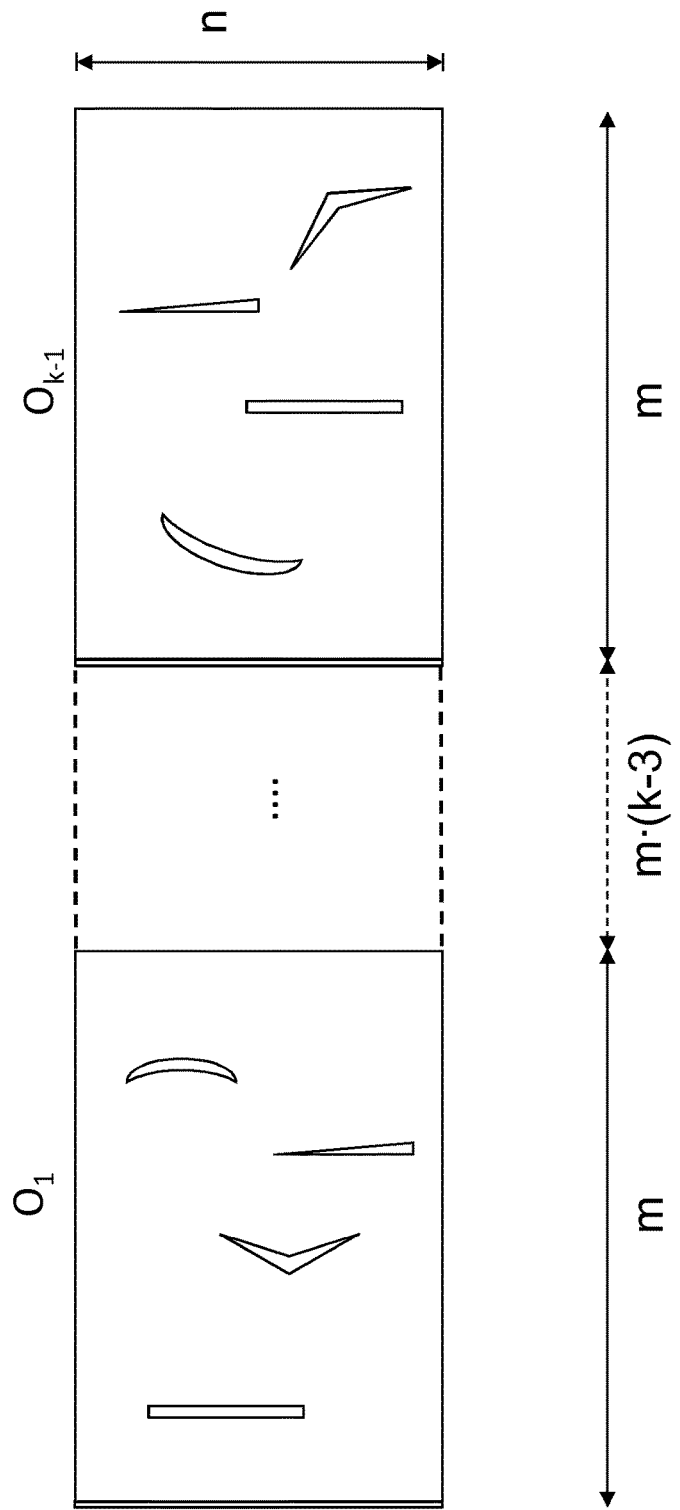
Fig. 2bis

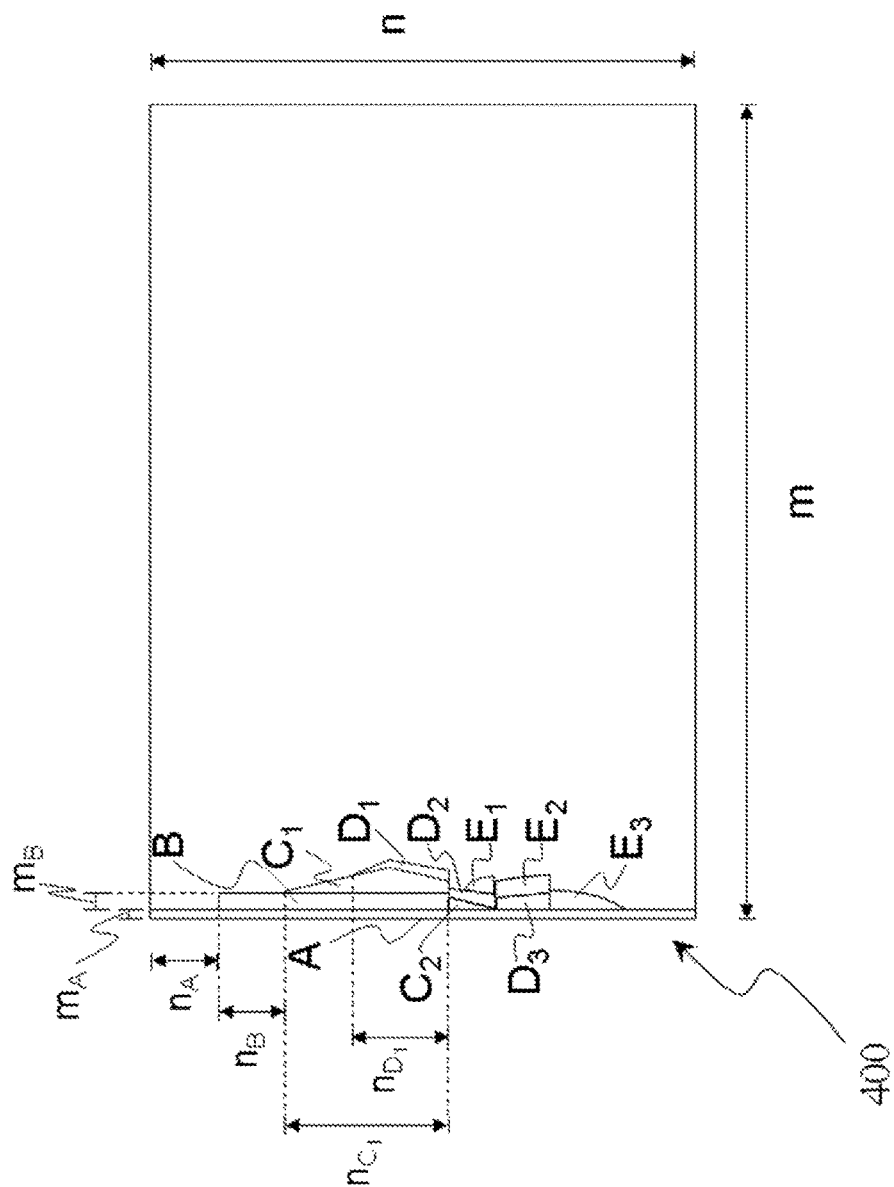

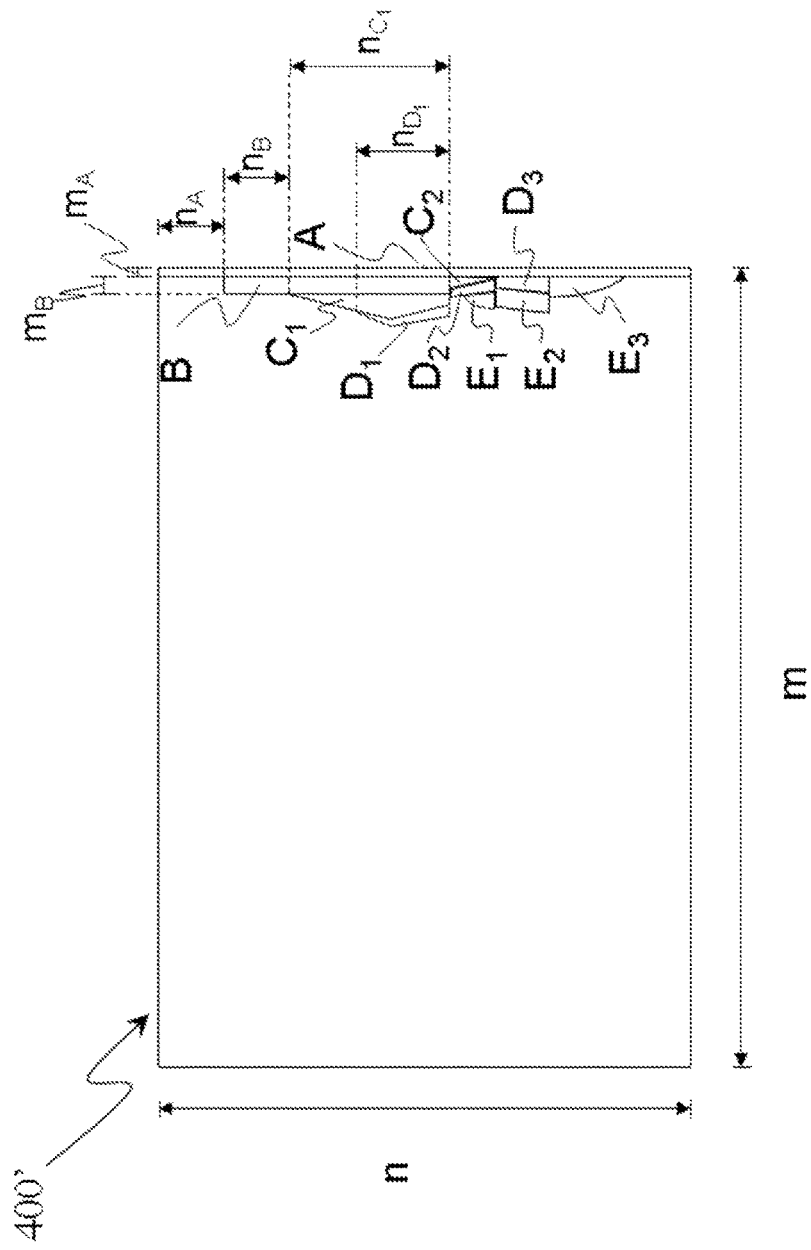

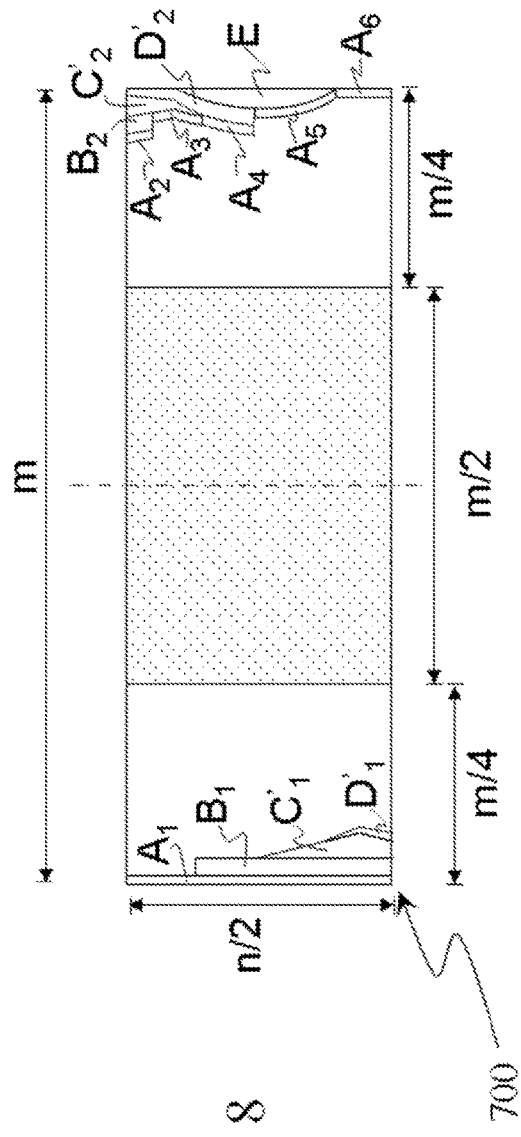
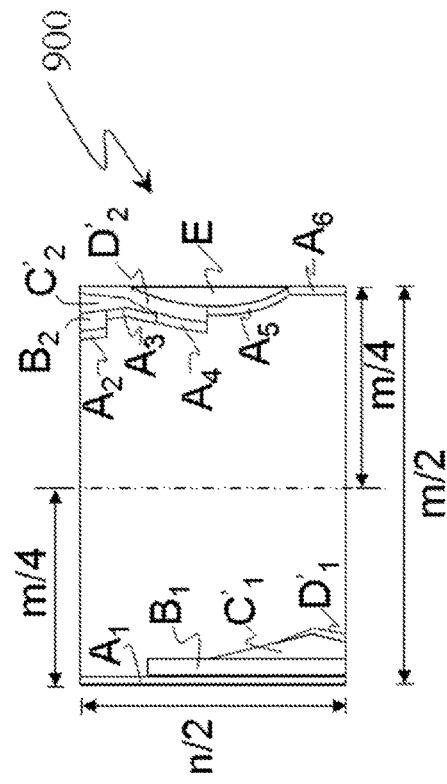
Fig. 8
Fig. 9

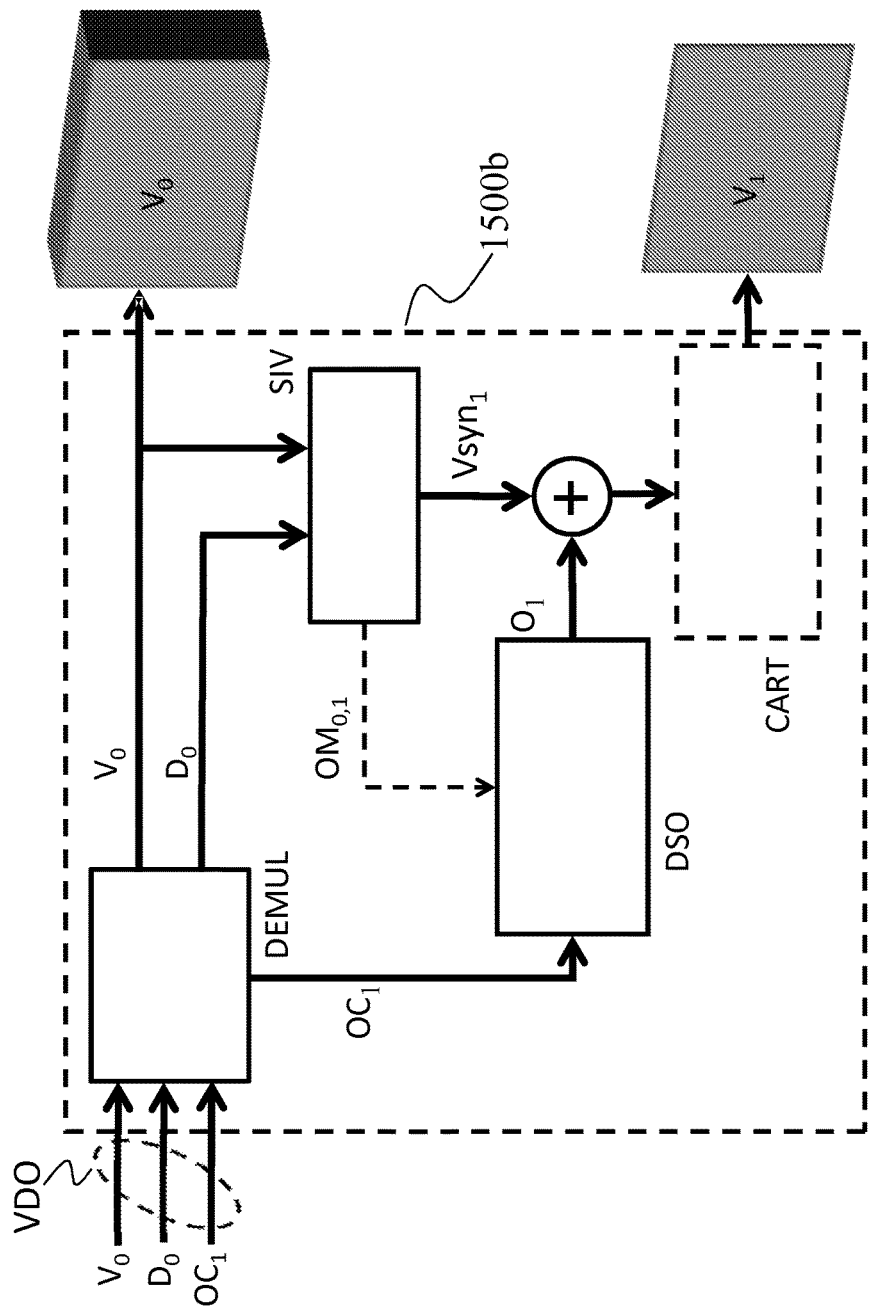
Fig. 15bis

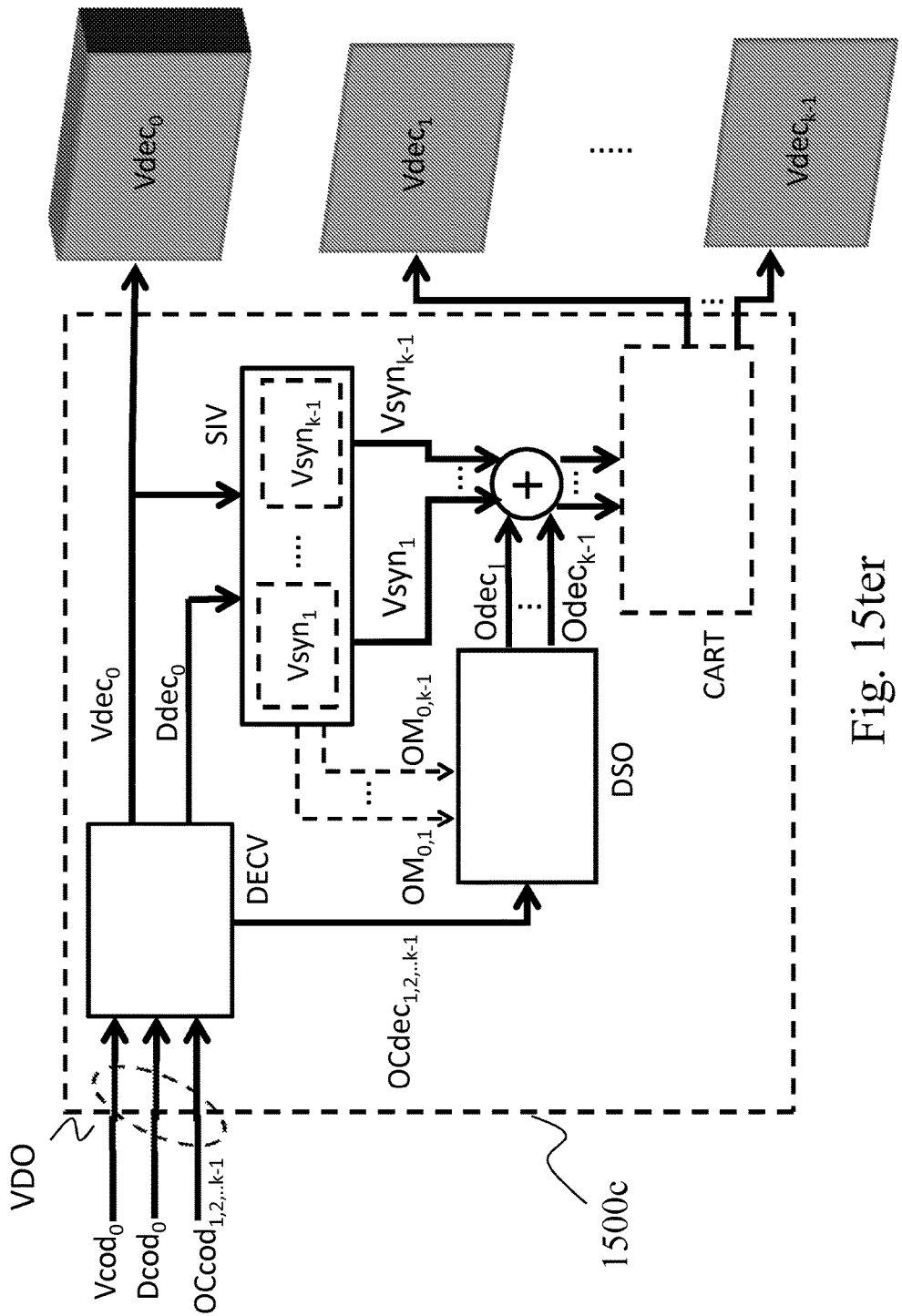
Fig. 15ter

METHOD FOR GENERATING AND RECONSTRUCTING A THREE-DIMENSIONAL VIDEO STREAM, BASED ON THE USE OF THE OCCLUSION MAP, AND CORRESPONDING GENERATING AND RECONSTRUCTING DEVICE

FIELD OF THE INVENTION

The present invention relates to the field of systems for processing a three-dimensional video signal, more specifically to a method for generating and reconstructing a three-dimensional video stream, based on the use of the occlusion map, and to a corresponding generating and reconstructing device.

BACKGROUND ART

The development of stereoscopic, i.e., three-dimensional, video applications largely depends on the availability of efficient formats for representing and compressing the three-dimensional video signal. Moreover, in television broadcast applications (3D-TV) it is necessary to maintain the highest possible degree of backward compatibility with existing 2D systems.

The currently most widespread technical solutions are based on the so-called "frame compatible arrangement", wherein the two views (video images to be presented to the left eye and to the right eye, respectively) relating to the same time instant are suitably re-scaled, if necessary or appropriate, and then put together to form a single image. The most typical solutions are known as Top Bottom and Side by Side arrangements, wherein the two views are entered into a single frame one on top of the other or side by side from left to right. These solutions allow using the entire existing video signal distribution infrastructure (terrestrial, satellite or cable broadcasting, or streaming over IP network), and do not require new representation and compression standards. In addition, the AVC/H.264 coding standard already includes the possibility of signaling this type of composition of the stereoscopic signal, so that it can be correctly reconstructed and displayed by the receiver.

Applications which are more advanced than stereoscopy use more than two viewpoints, resulting in the necessity of representing, coding and transmitting a larger set of video sequences. In this frame, the state of the art is represented by the MVC standard (Annex G of AVC/H.264). MVC utilizes the known transform-type hybrid video coding paradigm, and allows to eliminate some redundancy among the various views. Said standard has been chosen for disk-stored stereoscopic videos and for Blu-ray players.

Finally, another possibility consists of 3D video representations not only using the video signal. The best-known example is represented by the approach known as video plus depth map (V+D, i.e., Video+Depth) and variants thereof with more views and depth maps. The depth map enables new methodologies, such as the possibility of synthesizing intermediate viewpoints more or less close to the main view, to be used, for example, with a self-stereoscopic 3D display. There is currently just one standard, i.e., MPEG-C, for signaling this type of format. The values of the depth map can be estimated or measured by suitable sensors. Such values are generally represented as images with 256 gray-scale levels and compressed by using standard techniques (MPEG-x, H.26x)

Technical Problems and Drawbacks of Known Solutions

The solutions currently available suffer from many technical problems and drawbacks.

The frame-packing arrangement approaches only allow to represent two views, thus sacrificing image quality in terms of spatial resolution. They may also have an adverse effect upon the efficiency of standard compressors, while also not enabling the generation of intermediate viewpoints.

The use of the MVC standard and of sequences with many viewpoints poses a number of problems. First of all, the efficiency of the MVC encoder changes much depending on the type of content, and coding gain is generally rather low. Coding efficiency is definitely inadequate for cases with many views. In addition, the computational cost of inter-view coding options is very high.

V+D representations appear to be promising both in terms of coding efficiency and for the possibility of generating intermediate viewpoints.

The systems that have been proposed so far for compressing the depth signal D (Depth) use standard encoders or specially devised solutions. In both cases, it has been observed that the signal D is easier to compress and consequently requires a smaller band compared to the video. The most critical aspect of V+D systems is the quality of the image that can be synthesized starting from V+D. Given a view and the associated depth map, it is possible to generate a new view with the exception of some areas which are occluded due to geometrical reasons or depth estimate errors. This requires the use of interpolation and/or inpainting mechanisms (i.e., reconstruction of missing or corrupted parts), which generally produce images of non-optimal quality. In order to reduce the occlusions, another option is to increase the number of views and depth maps to be used during the synthesis process. For example, the software used by the MPEG standardization committee produces an intermediate view by starting from 2 views and 2 depth maps; on the one hand, this improves the quality of the synthesized image by reducing the occluded areas thereof, but on the other hand it requires the compression of two video signals, thus making this solution not much feasible in terms of transmission band occupation. One possible alternative is to estimate the occluded areas at the coding stage in order to code them and then explicitly send them to the decoder, which will thus be able to reconstruct the supplementary views with better quality.

US patent 2010/0195716 A1 proposes to code just one view (the central one) with the associated depth map, and to estimate, during the coding process, the occluded areas for the right and left views to be used for view synthesis and stereoscopic vision. The non-occluded areas are explicitly signaled by using fixed values (e.g., the value 0), whereas the occluded pixels constitute a limited portion of the image; the video signal thus obtained, consisting of images only containing those occluded pixels which are useful for the decoding process, can be compressed by a standard encoder. Tests have shown that the required bit rate may reach a significant percentage of the total bit rate of the 3D video, although the occluded pixels are usually much less than the total number of pixels contained in one image.

There is therefore a need to optimize the compression of the occlusion images by means of suitable techniques capable of decreasing the bit rate required for storage and/or transmission thereof. It is also appropriate to exploit the typically limited extension of the occluded areas to ensure a more efficient coding and multiplexing thereof, by using, whenever possible, existing coding and decoding devices.

SUMMARY OF THE INVENTION

It is therefore one purpose of the present invention to provide a method for generating and reconstructing a three-dimensional video stream, based on the use of the occlusion map, as well as a corresponding generating and reconstructing device, which are adapted to overcome all of the above-mentioned drawbacks.

The present invention falls, for example, within the scope of V+D coding.

The generated video stream can be subjected to coding for transmission and then to decoding for reception. As an alternative, it can be made available for storage and/or video editing operations to be performed on the uncompressed stereoscopic content at the production stage, e.g., on removable storage media (DVD, Blu-Ray, or the like), where the coding operation is optional.

In one possible embodiment, the stereoscopic video is coded by coding the sequence of images from a reference view (e.g., the left view), the corresponding depth map, and a video sequence corresponding to the occlusions of the other view (e.g., the right view).

The occlusion map of a generic image of the sequence consists of an image representing the positions of the occluded pixels of one view with respect to the reference view, also referred to as main view; it is obtained by using the left view and the corresponding depth map. For example, one may use the same synthesis algorithm for the right view in order to locate those pixels which cannot be synthesized and which are known as occlusions.

Other techniques may alternatively be used for estimating the occluded areas, e.g., based on the derivative of the depth map that identifies areas with large depth variations; the latter generally correspond to the edges of the objects in the foreground, which generate occlusions when the viewpoint is changed. At any rate, the mapping of the positions of the occlusions calculated at the generation stage, with the possible coding thereof, is carried out as a function of the subsequent compression operations, but it needs not be explicitly coded and transmitted to the decoder. At the reconstruction stage, in fact, on the basis of the same reconstructed view and depth it is possible to repeat the estimate made at the generation stage and implicitly obtain the positions of the occlusions, i.e., the same occlusion mapping.

Therefore, the present invention provides the option to reorganize the occluded image, so as to make more efficient the subsequent compression thereof executed through a coding operation. This operation must be inverted by the decoder by exploiting the knowledge of the occlusion map. As will be explained below, said map can be re-obtained by the decoder without needing to explicitly code and transmit said map.

When reconstructing the video stream, possibly after it has been coded and transmitted, what must be known and possibly explicitly coded and transmitted is the value of the occluded pixels, while the correspondence between the occluded pixels and the position they belong to can be implicitly obtained at the reconstruction stage, as will become apparent from the following detailed description.

The availability of the same occlusion mapping information at the generation and video stream reconstruction stages is used by the present invention to more efficiently represent the video information associated with such occlusions, thereby making it possible to reduce the bit rate required for a possible coding of the video stream containing the occlusion maps and to reduce the dimensions of the images and, in some embodiments of the invention, also the frequency thereof.

In particular, since the position of the occluded pixels is implicitly known when reconstructing the video stream, at the generation stage it is possible to reposition the occluded pixels in the occlusion image in accordance with strategies aimed at improving the compressibility thereof. For example, one may work row by row and align all the occluded pixels towards the left edge, thus compacting the occluded image into an area smaller than the image.

This spatial reorganization of the pixels can be reversed at the reconstruction stage, when the occluded pixels are processed row by row and, for example, from left to right, or anyway as previously done at the generation stage. By knowing the mapping of the occlusions, the n-th pixel of the m-th row is put again into the position corresponding to the n-th occluded pixel of the m-th row of the occlusion map; the values of the occluded pixels are thus correctly replaced into their original position. Finally, the right view is synthesized by using a synthesis algorithm by starting from the left view and the depth map; the occluded areas where the synthesis process is unsuccessful can be obtained through the above-described procedure.

Any other spatial reorganization of the occluded pixels aimed at improving the subsequent compression procedure may be used in accordance with the present invention.

As will be explained more in detail below, this spatial reorganization operation allows, in certain conditions, to reduce the number of images required for representing a given stereoscopic content in V+D+O mode (which stands for Video+Depth+Occlusion or Video+Disparity+Occlusion, also known as VDO), i.e., comprising a view sequence, a depth or disparity sequence, and an occlusion sequence, in that multiple suitably compacted images, which contain the occlusions of a view taken at different time instants, can be put together into a composite image composed of a plurality of compacted component images.

It is a particular object of the present invention, in accordance with the claims, to provide a method for generating a three-dimensional video stream by starting from a sequence of video images, said sequence comprising a first view, at least one second view of a scene, as well as a depth map of said first view, or a disparity map of said at least one second view with respect to the first view, the method comprising, for one image, the following steps: obtaining at least one occlusion image comprising the occluded pixels of said second view by starting from said depth map or from said disparity map; generating a compacted occlusion image by spatially repositioning said occluded pixels of said at least one occlusion image, so as to move said pixels closer to one another; said three-dimensional video stream comprising, for one image, said first view, said depth map or said disparity map, and said at least one compacted occlusion image.

It is another object of the present invention, in accordance with the claims, to provide a device for generating a three-dimensional video stream by starting from a sequence of video images, which is adapted to implement said method for generating a three-dimensional video stream.

It is a further object of the present invention, in accordance with the claims, to provide a method for reconstructing a three-dimensional video stream comprising a sequence of video images, which comprises, for one image, the following steps: receiving a first view of said sequence of video images, a depth map of said first view, or a disparity map between said first view and at least one second view of said sequence of video images, and at least one compacted occlusion image obtained by spatially repositioning the occluded pixels of at least one occlusion image of said at least one second view, so as to move said pixels closer to one another; obtaining at least one reconstructed occlusion image comprising the occluded pixels of said at least one second view repositioned in the position they were in prior to the compaction operation carried out in order to obtain said at least one compacted occlusion image; reconstructing said at least one second view by starting from said first view, from said depth map, or, respectively, from said disparity map, and from said at least one reconstructed occlusion image; said reconstructed three-dimensional stream comprising said received first view and said at least one reconstructed second view.

It is a further object of the present invention, in accordance with the claims, to provide a device for reconstructing a three-dimensional video stream, which is adapted to implement said method for reconstructing a three-dimensional video stream.

It is a further object of the present invention to provide a method and an associated device for generating a three-dimensional video stream by starting from a sequence of video images, which are adapted to process a number of views greater than two, in accordance with the claims.

It is yet another object of the present invention to provide a method and an associated device for reconstructing a three-dimensional video stream by starting from a sequence of video images, which are adapted to process a number of views greater than two, in accordance with the claims.

It is a further object of the present invention to provide a video stream representing a sequence of three-dimensional images, in accordance with the claims.

It is a particular object of the present invention to provide a method for generating and reconstructing a three-dimensional video stream, based on the use of the occlusion map, as well as a corresponding generating and reconstructing device, as set out in the appended claims, which are an integral part of the present description.

BRIEF DESCRIPTION OF THE DRAWINGS

Further objects and advantages of the present invention will become apparent from the following detailed description of a preferred embodiment (and variants) thereof and from the annexed drawings, which are only supplied by way of non-limiting example, wherein:

FIG. 1*bis* shows a variant of the diagram of FIG. 1;

FIG. 1*ter* shows a possible extension of the diagram of FIG. 1 to the case of a three-dimensional video signal with more than two views;

FIGS. 2 to 14 show representation variants of examples of occlusion maps and images and of the creation of compacted occlusion images, in accordance with the principles of the present invention;

FIG. 15*bis* shows a variant of the diagram of FIG. 15;

FIG. 15*ter* shows a possible extension of the diagram of FIG. 15 to the case of a three-dimensional video signal with more than two views;

In the drawings, the same reference numerals and letters identify the same items or components.

DETAILED DESCRIPTION OF A FEW EMBODIMENTS OF THE INVENTION

Figure 1:
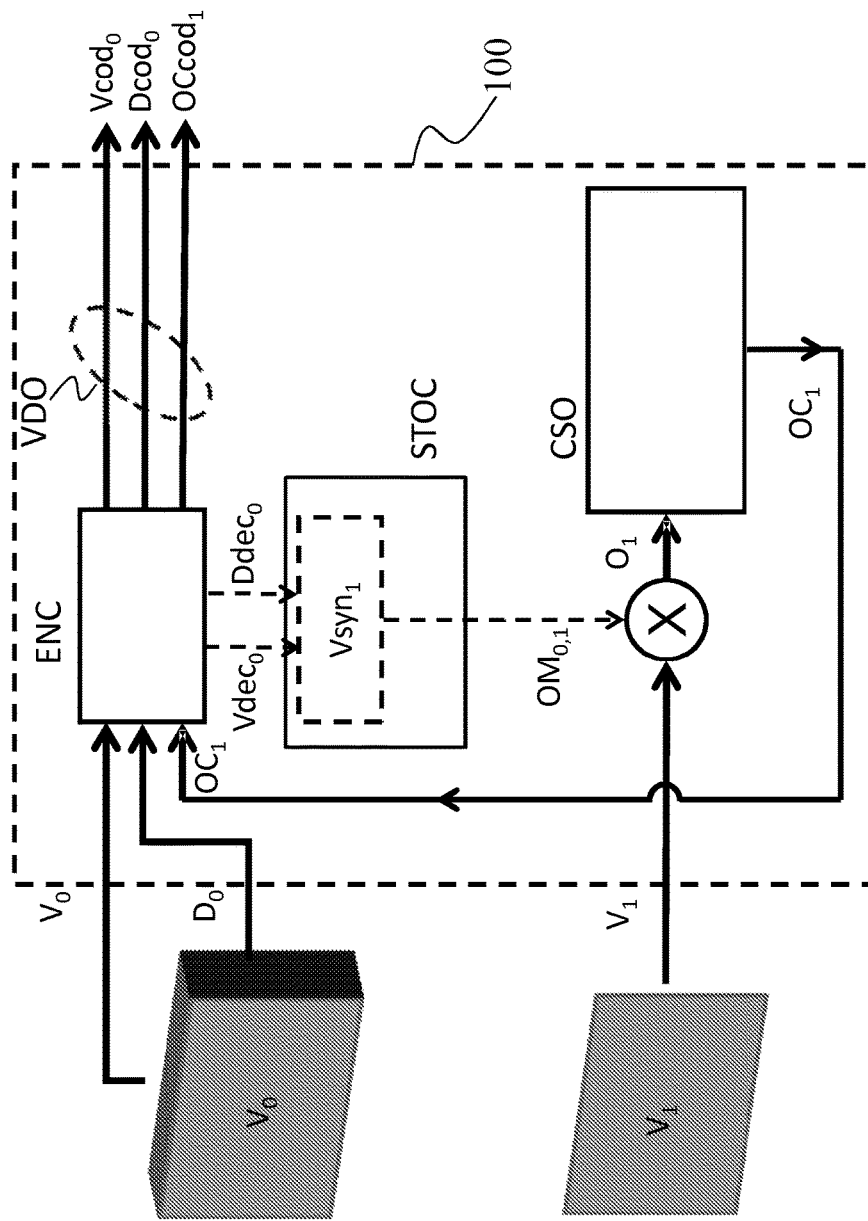
FIG. 1 is a block diagram of a three-dimensional video signal generator according to the present invention.

FIG. 1 shows a block diagram of one possible embodiment of the three-dimensional video stream generator 100 as specified by the present invention.

The diagram shown in FIG. 1 refers to the case of a stereoscopic video to be displayed on a television set or another stereoscopic video reproduction apparatus. In this case, the user cannot choose the viewpoint and is bound to vision of two views $V_0$ and $V_1$ with fixed disparity. As input data, the generator requires a first video sequence $V_0$, the corresponding depth map sequence $D_0$, and a second video sequence $V_1$. The depth map sequence $D_0$ can be measured or estimated by starting from the two views, and is generally represented as a monochromatic video, i.e., a video consisting of a sequence of images with pixels having intensity values between 0 and 255. The video sequence $D_0$ can be obtained through any method, without distinction, upstream of the generator 100 or within the generator 100 itself through a suitable functional block adapted to obtain said sequence from knowing $V_0$ and/or $V_1$. The video sequence $D_0$ may also be composed of images undersampled from those originally obtained through the estimation process carried out on images having the same size as the view sequence $V_0$ or $V_1$. The block diagram of FIG. 1 refers to the first hypothesis, and therefore this functional block is absent and it is assumed that $D_0$ has been previously obtained by whatever means by starting from $V_0$ and/or $V_1$.

According to the present invention, the signals $V_0$ and $D_0$ can also be coded by using a suitable compression technique, e.g., through a standard video encoder such as, for example, one of the AVC/H.264 type.

A video encoder implemented via software usually also provides the decoded images of the input video signals or streams, in that they are used in the motion estimation/compensation process of the encoder. Should decoded images be unavailable in the standard encoder, a suitable decoder may be used for decoding the coded images produced by the encoder with the same video compression and decompression technique in use. The corresponding decoded video signals or streams $Vdec_0$ and $Ddec_0$ can then be used by an occlusion estimator block STOC.

The block STOC may comprise a function (View Synthesis), e.g., implemented through a synthesis algorithm, capable of producing an estimated sequence of the view $V_1$, referred to as $Vsyn_1$: this sequence is not outputted, but can be used in order to determine the positions of the occluded pixels forming the so-called occlusion map. The synthesis stage implicitly produces a video sequence (also referred to as video stream or simply as video) of the occlusion map, consisting of binary images representing the set of occlusions $OM_{0,1}$. A value of 1 in $OM_{0,1}$ indicates that it is not possible to synthesize the corresponding pixel of the image of $V_1$ by starting from the corresponding images of $V_0$ and $D_0$. The values 0 represent those areas where the synthesis is successful, i.e., for which there is an estimated value in the sequence $Vsyn_1$.

The techniques and rules pertaining to the definition of the occlusion maps may vary depending on the synthesis algorithm in use. For example, an occlusion estimation technique may be used by starting from images of the decoded video sequence $Vdec_0$ and $Ddec_0$, which generates images with synthesized pixels associated with probabilistic result validity values, depending on the reliability of the estimation. A decision block may assign the value 0 or 1 to a pixel depending on whether synthesis reliability is higher or lower, respectively, than a preset threshold value, or on the basis of any other decision criterion considered to be appropriate. On the coding side, video processing algorithms may also be used which do not generate any synthesized pixel value, while nonetheless being able to estimate the probability that a synthesis algorithm of the view $V_1$ will give or not a correct value for a given pixel of the image of the corresponding video sequence.

The decoded video sequences $Vdec_0$ and $Ddec_0$ are preferably used, as opposed to the original ones $V_0$ and $D_0$, so as to obtain procedures and results in line with those that can be obtained at the reconstruction stage, where the original video signal sequences cannot be accessed. If there is a video signal encoder, a decoder will also be present, arranged in cascade with the video encoder, to obtain the decoded video sequences $Vdec_0$ and $Ddec_0$ by starting from the coded streams $Vcod_0$ and $Dcod_0$.

The above applies when the invention is implemented with coding on the generation side and decoding on the reconstruction side to decrease the occupation of the channel (for transmission) or of the storage medium (for storage) by the stereoscopic content. If the coding and decoding processes are not carried out, the view $V_1$ can be calculated directly from $V_0$ and $D_0$. In such a case, the V+D+O triplet will be composed of three uncoded sequences $V_0$, $D_0$ and $OC_1$, wherein the latter will have been spatially compressed or compacted in accordance with the present invention. Therefore, also the occlusion estimator block STOC will use the sequences $V_0$, $D_0$ instead of $Vdec_0$ and $Ddec_0$ (FIG. 1$bis$).

At this point, it is possible to retrieve a sequence of video images of the occlusions $O_1$ comprising those images which have pixel values other than zero (or another predetermined neutral value) for the occluded pixels alone, where the corresponding value is present. When zero is selected as the value of non-occluded pixels, the images of $O_1$ can be obtained by simply multiplying the co-positioned coefficients of the images of the sequence $OM_{0,1}$ and $V_1$.

Figure 2:
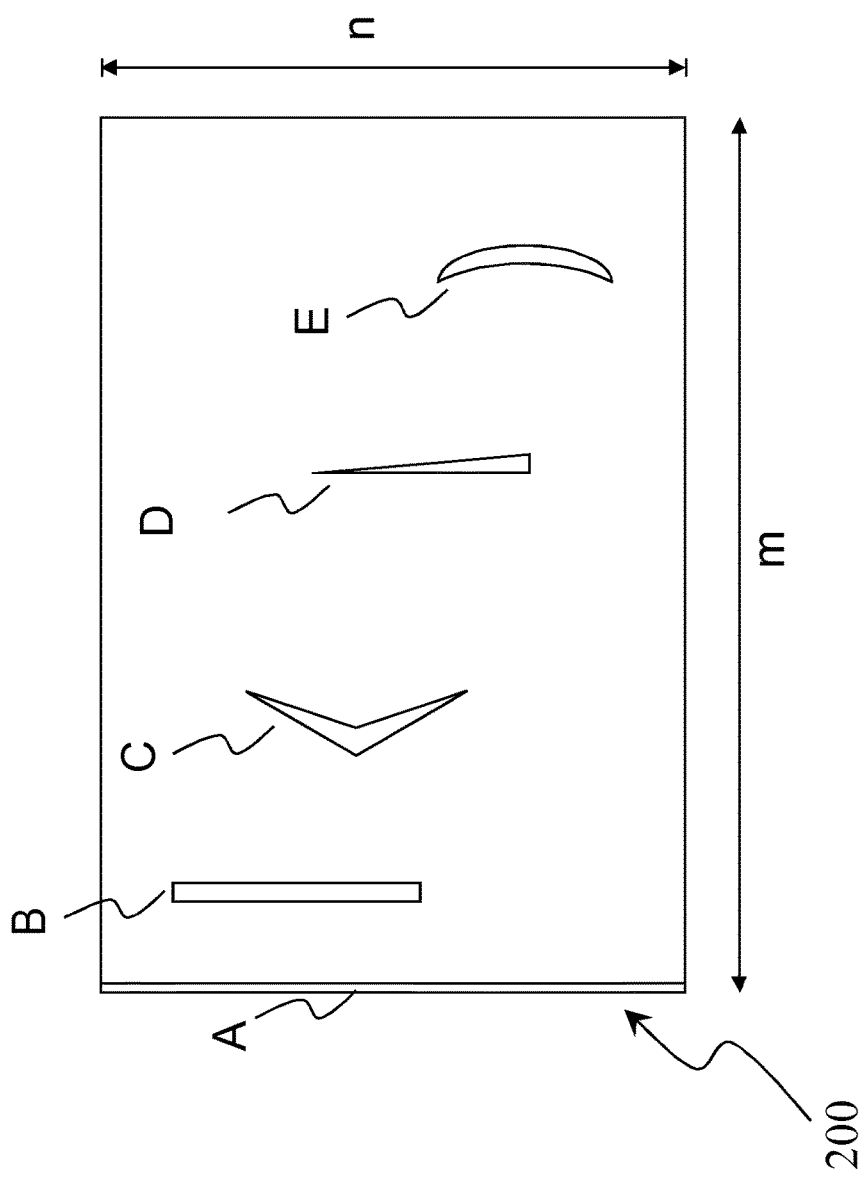

Typically an image 200 of the video sequence comprising the occlusion images consists of a series of isolated regions containing occluded pixels, i.e., those pixels which are not visible in the corresponding image of the video sequence $V_0$. One possible representation of a typical component image of $O_1$ is shown in FIG. 2. The image is composed of n rows of m columns of pixels and may have, in general, the same dimensions as one image of $V_0$ and $V_1$. In said Figure it is assumed that the regions containing the occluded pixels (also referred to as occluded regions for brevity) are those designated by letters A, B, C, D and E. For more clarity, regions having different and rather simple regular geometric shapes have been chosen, even though they may actually have irregular and complex shapes or may comprise, for example, annular regions, i.e., internally unconnected regions incorporating one or more areas composed of non-occluded pixels. The area of the image 200 uncovered by occluded regions contains pixels having neutral values, e.g., zero, to indicate that it contains no occluded pixels, or at least that it has been estimated to contain no occluded pixels by the estimator block of the encoder through the use of the selected synthesis algorithm.

Figure 3:
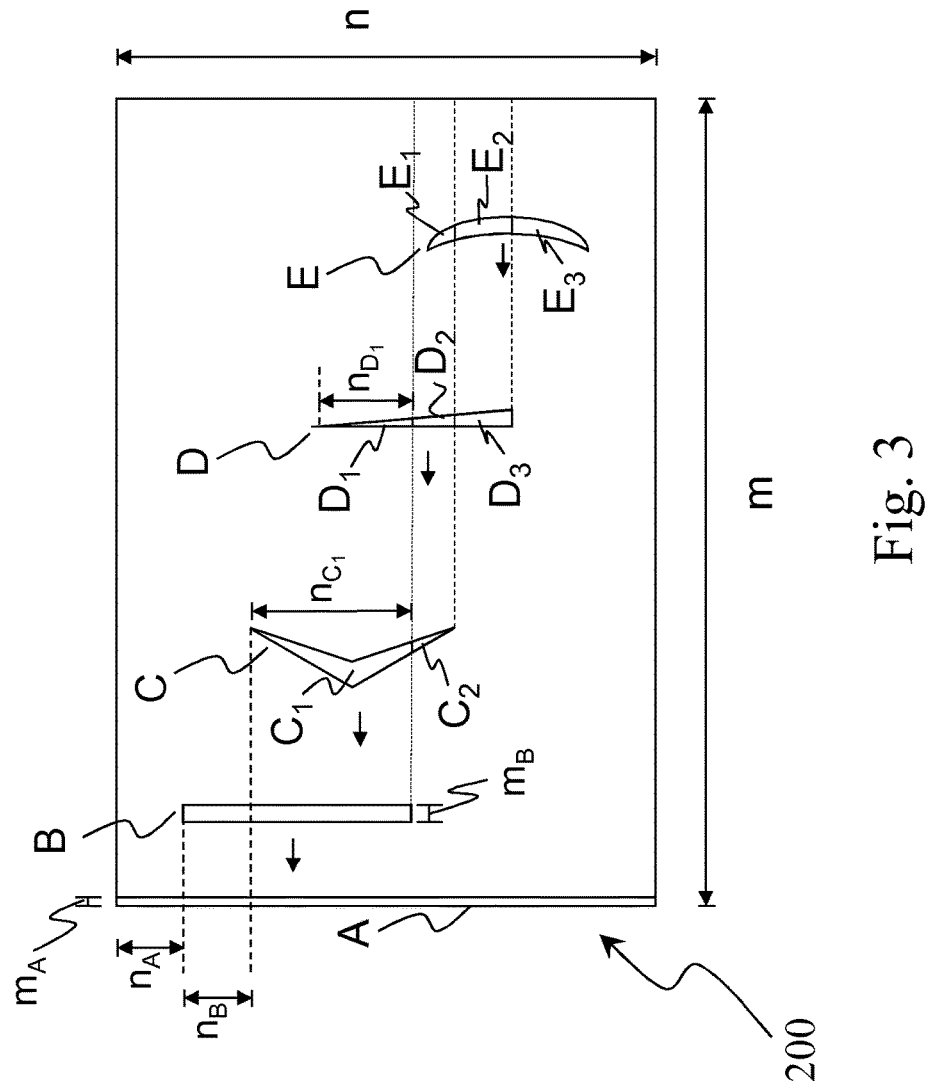

The video sequence $O_1$ of the occluded images can be processed by an occlusion spatial compactor block CSO according to the present invention in various ways that may also take into account the fact that the resulting video sequence may possibly be subjected to compression by the standard video encoder. The first and simplest embodiment will now be described with reference to FIGS. 3 and 4. Let us assume that, as shown in FIGS. 2 and 3, the first $n_A$ rows contain, as occluded pixels, only those of the rectangular region A, i.e., the first $m_A$ pixels of this set of rows. The spatial compactor block generates a new image of n rows by m columns 400 and copies this rectangular block of $n_A$ by $m_A$ pixels to the upper left corner of the output image; along with said rectangular block, the remaining part of the first nA rows containing neutral values is copied as well. What is obtained is that the first $n_A$ rows of the output image 400, belonging to the output video designated $OC_1$, coincide in this particular example with those corresponding to the input image 200 of $O_1$.

Continuing the row-by-row scanning of the image 200, the spatial compactor block detects that the next group of nB rows, from $n_A+1$ to $n_A+n_B$, includes as occluded pixels the mA occluded pixels of the region A and the mB occluded pixels of the rectangular region B. Said block will thus copy such two groups of occluded pixels into the image 400 in the same order in which they show in the image 200, moving them from left to right and removing any neutral non-occluded pixels between the regions A and B. The situation of FIG. 4 will thus be obtained, wherein the first nB rows of B have been moved from left to right against those of A belonging to the same rows (from the $n_A+1$-th one to the $n_A+n_B$-th one) of the image 200.

In the next set of $n_{C1}-n_{D1}$ rows (from the $n_A+n_B+1$-th one to the $n_A+n_B+n_{C1}-n_{D1}$-th one) there are additional occluded pixels belonging to the upper part of the occluded region $C_1$, which in turn constitutes the upper part of the larger occluded region C having a quadrilateral arrow-point shape with one diagonal parallel to the horizontal side of the image 200. The spatial compactor block copies into the image 400 of the sequence $OC_1$, row by row, all the occluded pixels belonging to the regions A, B e $C_1$, skipping all the non-occluded pixels between A and B and between B and $C_1$. It should be noted that, after having been copied and compacted to the left, the pixels of the region $C_1$ lying against B in the image 400 form a figure having a different shape than the shape they had in the image 200.

For the next $n_{D1}$ rows of the image 200 (from the $n_A+n_B+n_{C1}-n_{D1}+1$-th row to the $n_A+n_B+n_{C1}$-th row), during the scan the spatial compactor encounters, in addition to the occluded pixels of A, B and $C_1$, also the occluded pixels of the triangular region $D_1$, which constitutes the upper part of a similar region designated D. These pixels are also compacted to the left against those of $C_1$ previously encountered while scanning the image 200 from left to right, without the neutral non-occluded pixels between $C_1$ and $D_1$ being copied. Also the region $D_1$ resulting from the compaction process takes, in the image 400, a different shape than the original shape it had in the image 200.

The spatial compactor CSO then continues the compaction operation upon the remaining rows of the image 200, compacting to the left, in succession, also the regions $C_2$ and $D_2$, followed by $E_1$, $D_3$ and $E_2$, and finally $E_3$. The m×n image 400 resulting from this operation, shown in FIG. 4, contains the same information about the occluded pixels as the input image 200, but in a form compacted to the left: all the rows contain at the beginning (from left to right), without solution of continuity, the occluded pixels of all the originally non-adjacent regions contained in the image 200. The next rows contain all the neutral pixels, having a value, e.g., zero, denoting occlusion absence. It must be pointed out that the image 400 has the same size as the initial one 200, and may therefore also contain one row totally composed of occluded pixels; this is however a very unlikely case, since in a generic row the occluded pixels are normally very few compared to the total number.

Of course, the occluded regions may alternatively be compacted to the right instead of to the left: in such a case, the compactor may carry out a scan of the rows from right to left and copy into the output image 400, row by row, the occluded pixels in the same order in which they are encountered while scanning the image 200, skipping the non-occluded pixels between any possible pair of occluded regions: the remaining pixels of the row will be filled with the value denoting occlusion absence. A compacted output image will thus be obtained, wherein all the occluded regions have been moved to the right one against the other, thus taking a shape and undergoing a disassembly which are different from those determined by compacting the same image to the opposite side.

It is important to point out that the compaction direction may be totally independent of the scan order and arrangement of the occluded pixels. Any combination of these two operating variables is possible, and the choice may depend, for example, on implementation advantages or on the bit rate reduction obtainable in the subsequent compression step. For example, let us assume that the image 200 of FIG. 2 is compacted to the right by arranging the occluded pixels in the same order in which they show in the generic row, proceeding from left to right. In this case, the output image of the compacted occlusion sequence $OC_1$ 400' shown in FIG. 4' will be obtained. This can be achieved by turning over the image 400 of FIG. 4 horizontally, in that the generic pixel p(i,j) of the image 400 is equal to the pixel p'(i,m−j+1) of the image 400', with 1=<i<=n and 1=<j<=m. As a side effect, in this particular case the order in which the occluded images are encountered in the images 200 and 400 in a given scan direction (from right to left or vice versa) will be the opposite of that in which the same images are encountered in the corresponding image 400'.

Figure 5:
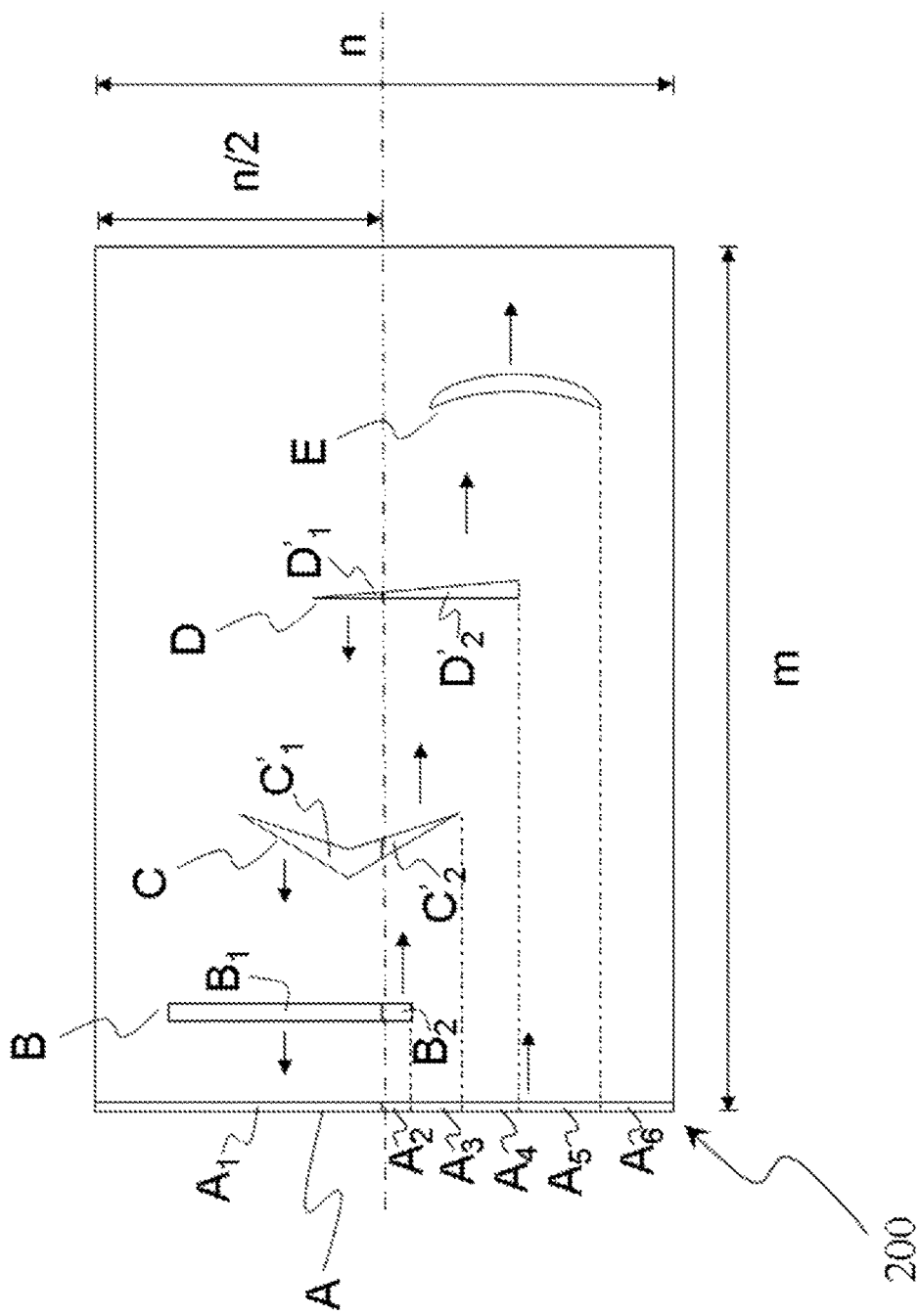

A second embodiment of the invention is illustrated in FIG. 5, which shows how the image 200 of FIG. 2, belonging to the sequence of video images of the occlusions $O_1$, can be compacted in a manner which is alternative to that previously described with reference to FIGS. 3 and 4.

In this case, a generic row of the image 200 of the n rows contained therein, where n is assumed to be an even number, is compacted differently depending on whether it belongs to the upper or lower half of the image.

The occluded pixels in the first n/2 rows of the image are stacked at the left edge of the image produced by the spatial compactor from left to right, whereas those belonging to the last n/2 rows are stacked at the right edge in the same order from right to left. The compaction directions are indicated by the arrows in FIG. 5, which preliminarily also indicates the disassembly of the original occluded regions A, B, C, D and E due to the compaction operation.

Figure 6:
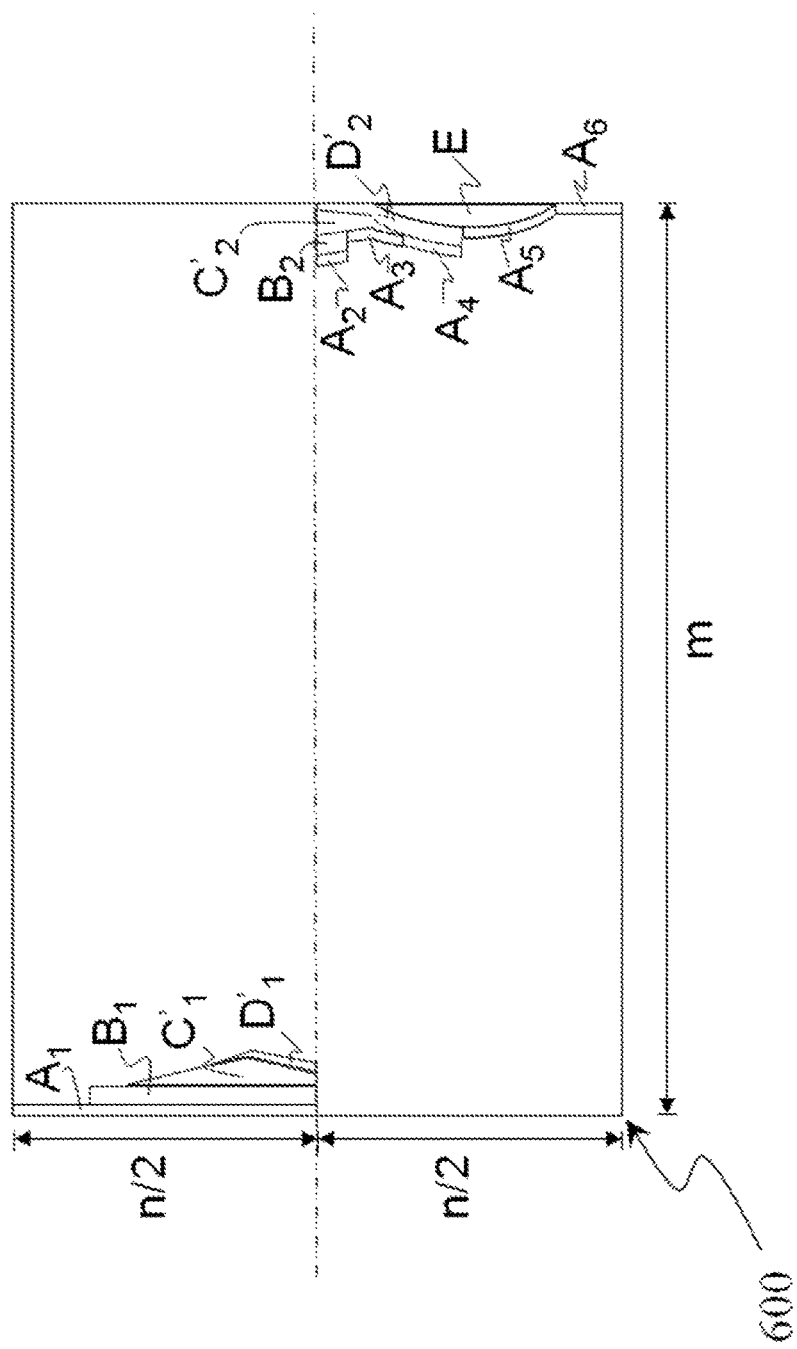

FIG. 6 illustrates the image 600 resulting from this operation: the first n/2 rows of the resulting image have the same arrangement of the first n/2 rows of the image 400, whereas in the second n/2 rows the occluded regions have been compacted against the right edge of the image in a fragmentary and deformed way consequent on the horizontal spatial compaction. It must be pointed out that, with this combination of compaction direction opposite to the arrangement order, all the pixels of the occluded region of the image 600 will show in the same order in which they were in the original image 200. In most cases, the number of non-occluded pixels will be much greater than the number of occluded pixels in all rows of the images of $O_1$ and $OC_1$. Some image space is thus wasted, in that it will contain information that will turn out to be useless for the decoder, which will use, for the non-occluded pixels, information contained elsewhere, i.e., in the coded and then decoded sequences $V_0$ and $D_0$.

If there are not rows containing a number of occluded pixels greater than m/2, then it is possible to resize the image 600 of $OC_1$ without losing information, by copying the compacted occluded regions at the lower right edge of the last n/2 rows of the image 600 to the upper right edge of the first n/2 rows of the same image and then removing the last n/2 rows. The image 700 shown in FIG. 7 is thus obtained, the size of which is m×n/2, which contains half the pixels of the original image 200 without losing any information about the occlusions present therein.

The output images may be subjected to compression as they are, i.e., in m×n/2 size; as an alternative, the compactor may additionally carry out a step of halving the number of images of the output sequence by placing pairs of m×n/2 half-images 600 of the sequence (e.g., two temporally successive images) into single m×n images.

In one embodiment of the present invention, the resulting video sequence can be compressed by a standard video encoder ENC. In this case, the spatial uncompactor DSO (FIG. 15) included in the decoder 1500 (FIG. 15), as will be described hereafter, carries out an inverse step of obtaining the half-images 700 by starting from the full-size m×n images.

Figure 7:
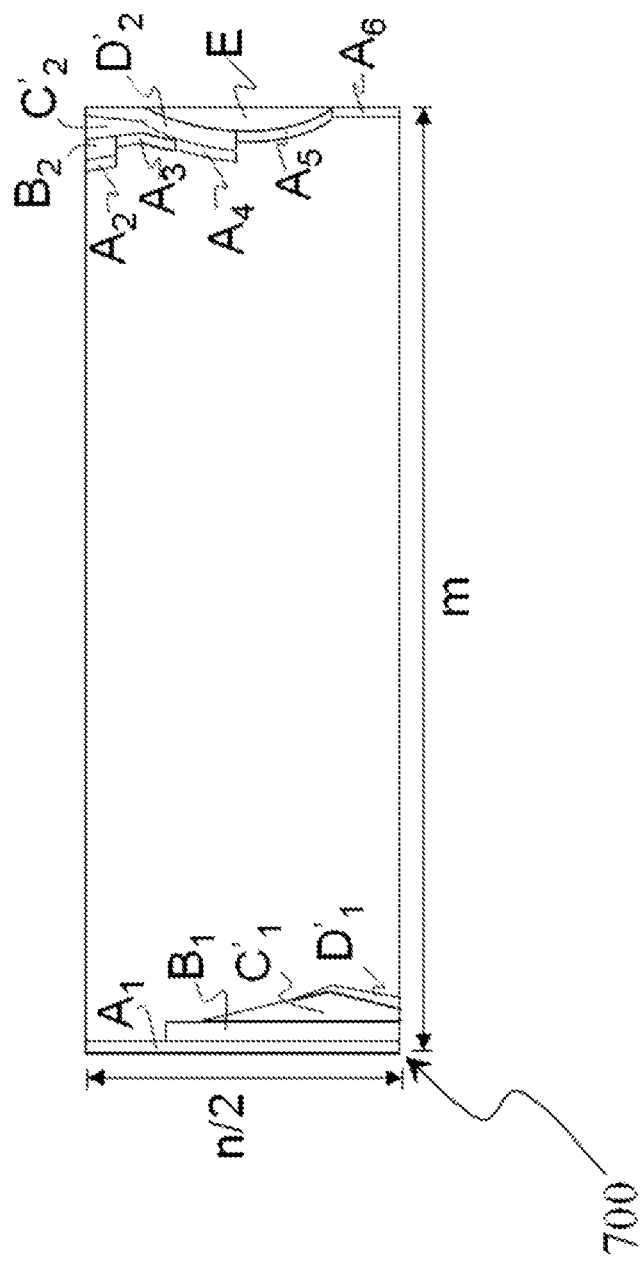

The halving of the horizontal dimension of the images of the compacted occlusion image sequence $OC_1$ is possible without losing information, if the number of occluded pixels in one row of the image does not exceed the value m/4: the hypothesis is verified in most cases, and also for the compressed occlusion image shown in FIG. 7.

FIG. 8 highlights that the image 700 contains a central area, m/2 columns wide, composed of non-occluded pixels, which are therefore totally useless from an information standpoint. The spatial compactor can remove this central area and obtain an occlusion image like the one shown in FIG. 9, of m/2×n/2 size, which will still contain all the occluded pixels of the original m×n image 200 of FIG. 2, while containing only one fourth of the pixels of the latter. The video sequence constituted by the horizontally and vertically halved images 900 may be supplied in such form to the standard video encoder ENC, or prior to that the compactor may appropriately compose groups of four m/2×n/2 images into single m×n images, thereby reducing by a factor of four the number of images belonging to the output video sequence $OC_1$ to be coded, compared to the uncompacted input occlusion video $O_1$.

In order to maximize the spatial compression efficiency, it is possible to arrange into a single output image four temporally successive m/2×n/2 images of the input sequence in accordance with a preset configuration, constant throughout the length of the video. In this case as well, the spatial uncompactor DSO of the decoder 1500 according to the present invention will carry out the operation inverse to that carried out by the spatial compactor of the encoder.

At this point, it is clear that it is possible, in principle, to execute the horizontal halving procedure r times upon the input image $O_1$ received by the compactor CSO without losing information, provided that the maximum number of occluded pixels per row therein does not exceed m/2r, i.e., ½r times the number of pixels per row of the full-resolution image. The vertical dimension being equal, the compactor can group 2r images with m/2r horizontal dimension into one image with m horizontal dimension, thereby reducing by a factor 2r the number of images contained in the compacted output sequence $OC_1$ compared to the occlusion video sequence $O_1$, and hence to the original video sequence $V_1$.

As a general rule, it is possible to remove, without losing any occluded pixels, any number of pixels in a row as long as it is smaller than or equal to the number of non-occluded pixels of the occlusion image. This leads to the possibility of making size reductions for any number of pixels, thus altering the width of the images by any quantity, which may even not be an integer submultiple of their horizontal dimensions.

It is clear from the above that it is possible to divide the rows of the images 200 that compose the uncompacted occlusion video $O_1$ into two compaction areas (see FIG. 5) and then to compact the occluded pixels of such areas in a differentiated manner, as shown by way of example in FIG. 6.

Figure 10:
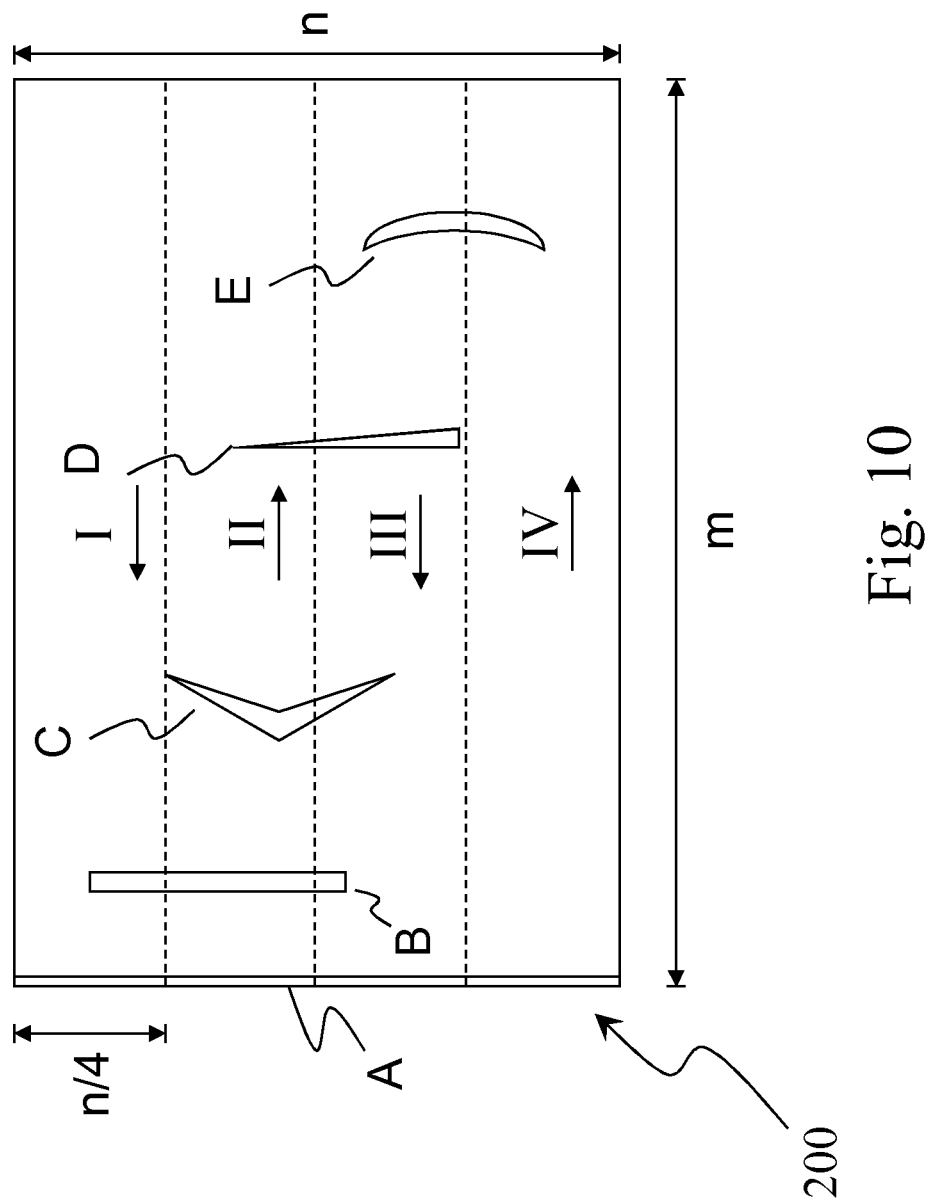

Now it is also possible to define a larger number of such areas, as shown by way of example in FIG. 10, wherein four compaction areas have been defined, each one composed of n/4 image rows with m pixels, designated by Roman numerals I, II, III and IV. The occluded pixels are alternately compacted to the left and to the right, as shown by the arrows, by using as a sorting direction the one opposite to the direction indicated by the arrows, as was done when compacting the two areas of the image 200 in FIGS. 5 and 6. The m×n compacted occlusion image 1100 shown in FIG. 11 will thus be obtained.

In this case as well, the compactor may halve the vertical size of the resulting image by executing operations for copying the occlusions from the lower right edge to the upper right edge of the two upper and lower half-images with m×n/2 size, so that the occluded pixels of the area II will be stacked at the right edge of the area I, while the occluded pixels of the area IV will be stacked at the right edge of the area III. At this point, the areas II and IV will have been left with no occluded pixels and can be eliminated to obtain the image with halved vertical size m×n/2 1200 shown in FIG. 12.

As illustrated for the image 700 of FIG. 8, since the maximum number of occluded pixels per row is smaller than m/2, it is possible to remove the central area of the image 1200, m/2 pixels wide, without losing any occluded pixels and obtain an image 1300 with halved horizontal and vertical dimensions. If this operation is carried out on all the images of $O_1$, a sequence $OC_1$ of m/2×n/2 size will be obtained, which may then be subjected to compression by the standard encoder. Alternatively, also in this case the compactor may reduce the number of images that compose the video $OC_1$ by grouping 4 images of m/2×n/2 size 1300 into single images of m×n size.

It is clear that, in general, the occlusion images can be sectioned into any integer number of compaction areas to be subjected to a given type of compaction, with the consequence that, as their number increases, the complexity of the operations to be executed will increase as well, especially those carried out by the compactor, while however also increasing the possibility of reducing the area occupied by the neutral areas of the images, still without losing any occluded pixels if the reduced number thereof allows it.

In general, the images of the sequence of compacted occlusions $OC_1$ outputted by the spatial compactor CSO are characterized by some areas abounding in information content, with high variance and with many high-frequency components, due to abrupt transitions of pixel values between the different occluded regions placed one against the other into a small space and between an occluded region and the neutral area. If the occlusion sequence is to be coded, this circumstance increases the bit rate required for that purpose. In order to reduce the presence of these high-frequency components, and hence to further increase the compression efficiency of the standard video encoder, it is possible to insert between the occluded regions, during the compaction process, a certain number of buffer pixels creating an intermediate transition zone composed of pixels having values suitably calculated to reduce the signal level difference between two neighboring occluded regions and between an occluded region and the adjacent neutral area.

Figure 14:
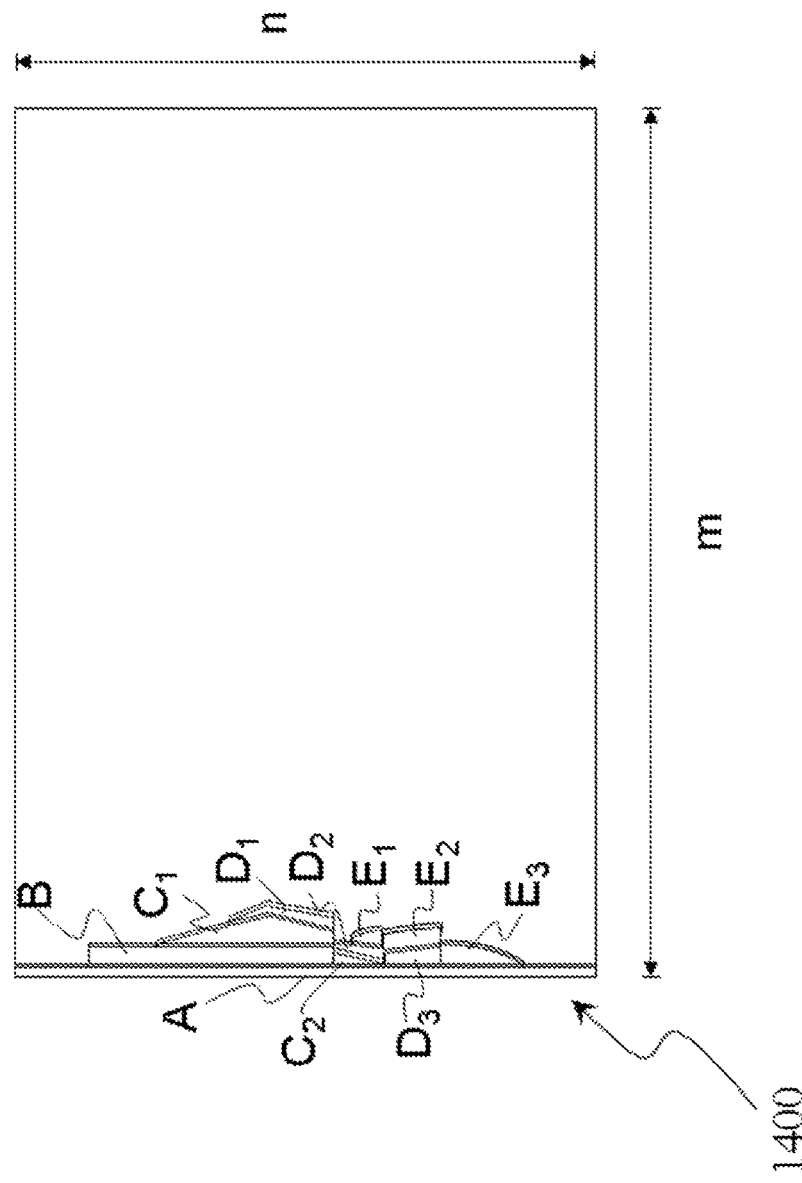

This removal of the abrupt transitions in the video of the images of the compacted occlusions $OC_1$ can be carried out in many different ways: a fixed or variable number of pixels per row may be used, and the value of the buffer pixels may be calculated with many different mechanisms; moreover, this elimination process can be executed in combination with any one of the compaction techniques described so far. A simple way to implement this measure is to use a fixed number of pixels, preferably a small number of just a few units (e.g., 1, 3, 5 or 7 buffer pixels), preferably an odd number. FIG. 14 shows the image 1400 obtained by using the same compaction method as used for the image 400 of FIG. 4, with the addition of buffer areas with constant horizontal thickness between any pair of occluded regions or between an occluded region and the neutral area; in this figure, it is assumed by way of example that the buffer areas are obtained by entering, row by row, a predetermined number of pixels equal for all the rows of the image.

In a simple embodiment, the values of the buffer pixels may only depend on pixels belonging to the same row and may be calculated as mean values of adjacent pixels. Let us assume that buffer areas composed of three consecutive pixels $z1$, $z2$ and $z3$, in this order, are interposed between two pixels $r1$, located before $z1$, and $r2$, located after $z3$, wherein $r1$ and $r2$ belong to two regions R1 and R2 which are assumed to be separate from an uninterrupted row of neutral pixels, which otherwise would be placed one against the other by the compactor in the absence of a buffer area.

One possible way of assigning values to the buffer pixels is as follows: $z2=(r1+r2)/2$, $z1=(r1+z2)/2$, and $z3=(z2+r2)/2$. In substance, for buffer areas composed of three pixels, the central one entered can be calculated as a mean value between the two row pixels adjacent to the area, while the two outermost pixels of the area are in turn the mean between the central one and the closest adjacent one. In general, one may use more or less complex buffer pixel calculation formulae, possibly also taking into account pixels present in rows other than those where the buffer pixels are located. One may even consider pixels of the same row or of other rows present in images of the occlusion video referring to previous times, other than the time the current image refers to.

The additional complication due to the insertion of buffer areas is marginal. In the first place, it solely concerns the compactor included in the encoder: the uncompactor on the decoding side will only have to discard the buffer pixels added by the compactor on the coding side from the images of the compacted occlusion video, and therefore it will only need to know which those added pixels are. The other side effect is a decreased maximum allowable number of occlusions in the video sequence that can be represented without losing any occluded pixels from an occlusion video provided with buffer areas. This effect is however negligible in most cases, particularly when compaction methods are used which do not reduce the size of the occlusion images (FIGS. 4, 5 and 6), because of the small quantity of occluded pixels per row compared to the total number, or wherein the addition of buffer pixels does not prevent from obtaining the desired reduction of the horizontal and vertical dimensions of the compacted occlusion images.

Referring back to the encoder diagram of FIG. 1, once the occlusion video sequence $O_1$ has been compacted in accordance with any embodiment of the present invention, with or without size reduction and/or addition of buffer areas, at the output of the spatial compactor block there will be a compacted occlusion video sequence $OC_1$ which, together with the video sequences $V_0$ and $D_0$, will compose the video stream generated in accordance with one aspect of the invention.

The compacted occlusion video sequence $OC_1$ can be compressed by a standard encoder ENC (FIG. 1), just like the other video sequences $V_0$ and $D_0$. The standard encoder will thus generate three coded video streams $Vcod_0$, $Dcod_0$ and $OCcod_1$, respectively, representing the coded sequences $V_0$, $D_0$ and $OC_1$, which compose the three-dimensional video sequence VDO (Video-Depth-Occlusions), e.g., to be transmitted on a video channel, in accordance with another aspect of the invention.

As an alternative, the triplet of contents can be stored, in a combined and coordinated manner, on any media in uncoded form, possibly with the addition of the signaling required by the regenerator for rebuilding the original component sequences, in particular the uncompacted occlusion sequence $O_1$. In this case (FIG. 1bis), the triplet of video sequences $V_0$, $D_0$ and $OC_1$ can be aggregated into a MUL unit, e.g., performing the multiplexing function.

In general, there may also be more than one standard encoder, each one compressing a subset of the three streams to be coded $V_0$, $D_0$ and $OC_1$, so that the sequences can be compressed in a manner optimized in accordance with the characteristics of the video sequence. At any rate, the coded video stream or signal will turn out to be composed, from a logic viewpoint, of three data streams $Vcod_0$, $Dcod_0$ and $OCcod_1$ corresponding to $V_0$, $D_0$ and $OC_1$. This triplet of data streams will constitute the output of the encoder 100. It may be, for example, physically multiplexed into a single data stream by using known techniques in a DVB transport stream or in any other type of data stream container adapted to simultaneously transport multiple input video streams; in such a case, this task will be carried out by a multiplexer device not shown in FIG. 1. This solution is particularly advantageous when the encoder operates in real-time mode. If the coding is delayed, instead, the video streams can be stored and/or transmitted separately as single video streams.

Figure 15:
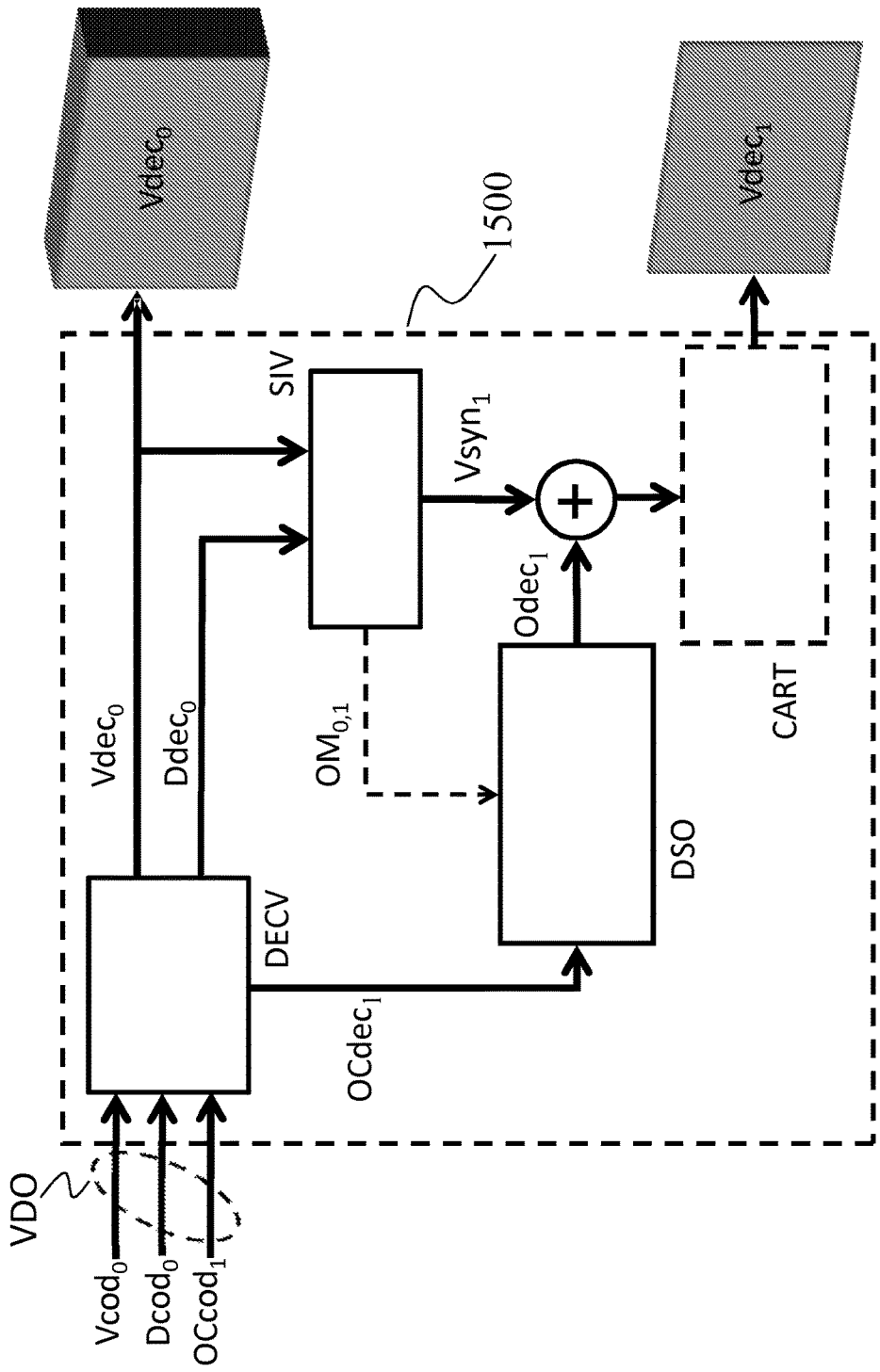
FIG. 15 is a block diagram of a three-dimensional video signal reconstructor according to the present invention.

FIG. 15 shows one possible implementation of the reception device 1500 adapted to reconstruct the three-dimensional video stream according to the present invention, which can be used, for example, when transmitting and receiving a video stream coded in accordance with one of the aspects of the invention. The receiver may comprise at least one standard video decoder DECV adapted to decompress the triplet of video sequences VDO including Vcod0, $Dcod_0$ and $OCcod_1$ generated by the video encoder of the encoder 100, in order to obtain a triplet of video sequences $Vdec_0$, $Ddec_0$ and $OCdec_1$ which are very similar to the three original sequences $V_0$, $D_0$ and $OC_1$, the only differences consisting of artifacts due to the compression and the subsequent compression thereof, as well as to possible undesired discrepancies caused by errors introduced while transporting the video signals (e.g., transmission and/or data read/write errors, noise, etc.). The sequences may have been multiplexed in a video stream container, in which case a demultiplexer device may be included, not shown in FIG. 15. In this case as well, the standard video decoder (e.g., of the AVC H.264 type) may actually be composed of multiple standard video decoders, each one operating upon a subset of the input triplet to optimize the decoding process, which can thus be adapted to the particular characteristics of different video sequences (e.g., image size, number of images per second, etc.). Such decoders may also work in parallel, possibly exchanging data necessary for their operation under the control of a governing unit that coordinates them.

When the reception device 1500 (FIG. 15bis) carries out operations for reconstructing a video stream by starting from the above-described video sequence components $V_0$, $D_0$ and $OC_1$, the standard video decoder block DECV may be absent, since said video sequences $V_0$, $D_0$ and $OC_1$ will correspond to the respective sequences $Vdec_0$, $Ddec_0$ and $OCdec_1$. A demultiplexing device DEMUL may be present on the input side to carry out operations inverse to those carried out by MUL of FIG. 1bis.

The decoded video sequence $Vdec_0$ relating to the first view may be sent to the display to be represented three-dimensionally in accordance with the particular technique in use, which may be, for example, a stereoscopic or self-stereoscopic one. The video sequence of the decoded depth map $Ddec_0$ (or $D_0$) is used in order to synthesize the video sequence relating to the second view $Vsyn_1$ by starting from the first view $Vdec_0$ (or $V_0$) through a block SIV executing an algorithm for synthesizing the second view by starting from a generic view of the stereoscopic pair and of its depth map. Contrary to the coding side, here it is necessary to generate the synthesized images of the sequence $Vsyn_1$ containing all the pixels that can be synthesized by the algorithm. Generally, they will be composed of a preponderant majority of synthesized pixels occupying almost the whole m×n image, while some regions of occluded pixels having unknown values will occupy the remaining part of the image, as shown by way of example in FIG. 3. These unknown values may be assigned a suitable preset value, e.g., zero. Said algorithm is preferably the same as the one possibly used on the generation and/or coding side for estimating the occlusions, so as to obtain a video sequence of the occlusion map $OM_{0,1}$ which is identical or anyway as similar as possible to the one obtained in the generator 100. The synthesis algorithm implicitly determines the occlusion map $OM_{0,1}$ as already described with reference to the encoder.

The occlusion map $OM_{0,1}$ is used for restoring the positions of the occluded pixels through a suitable occlusion spatial uncompactor block, which executes the uncompaction operations as well as any operations for expanding the horizontal and/or vertical dimensions and for eliminating the buffer areas, which are inverse to the operations carried out by the spatial compactor block, in the reverse order. It operates by starting from the video sequences of the decoded compacted occlusion images $OCdec_1$ (or $OC_1$) and of the occlusion map $OM_{0,1}$ to obtain an output video sequence $Odec_1$ (or $O_1$) comprising the uncompacted occlusion images. With reference, for example, to the embodiment shown in FIGS. 3 and 4, the spatial uncompactor performs a row-by-row scan of the image $OM_{0,1}$ of FIG. 3 supplied by the synthesis algorithm, finds the positions of the non-synthesized pixels of $OM_{0,1}$, and replaces the values of the compacted occluded pixels of the corresponding compacted occlusion image $OCdec_1$ of FIG. 4 into the original position.

The first nA rows of mA pixels of $OM_{0,1}$ contain unknown pixels constituting the positions of the pixels of the mAxnA rectangular area of the occluded region A, compacted into the homologous area of FIG. 4. For this set of pixels no repositioning is therefore carried out, since the positions of the uncompacted occluded pixels of Odec1 coincide for these $n_A$ rows with those of the compacted occluded pixels of $OCdec_1$ (or $OC_1$). The same happens for the first $m_A$ pixels of the next $n_B$ rows of $OM_{0,1}$ that also contain mB pixels belonging to the occluded region B. The uncompactor then leaves the first $m_A$ pixels of this row group where they are, while it moves the values of the following $m_B$ pixels of this row group to the right, into the positions occupied by the occluded pixels of $OM_{0,1}$ of the same $n_B$ rows. The values of the pixels of the image in the positions previously occupied in $Odec_1$ by the pixels of B prior to the transfer can be set to the value assigned to the neutral area of the non-occluded pixels. Proceeding in the same way for all the remaining rows of the images of $OM_{0,1}$ and $OCdec_1$ (or $OC_1$), the image of $Odec_1$ is obtained, which contains the occluded pixels in uncompacted form, i.e., in the same positions in which they are in the view they refer to, that is, the original uncompacted occlusion view of $V_1$ designated $O_1$.

In general, the corresponding images of the video sequences of $Odec_1$ and $Vsyn_1$ can be added up in the matrix direction to obtain the video sequence of the decoded second view $Vdec_1$, the images of which contain values which are valid for both the non-occluded pixels coming from $Vsyn_1$ and the occluded pixels coming from $Odec_1$. In this particular embodiment of the invention, this operation can be practically carried out by simply copying the values of the pixels of $OCdec_1$, row by row, into the positions of the non-synthesized pixels of $Vsyn_1$ indicated in the occlusion map $OM_{0,1}$, in the order in which they are encountered while scanning the rows from left to right: one can thus directly obtain $Vdec_1$ from $Vsyn_1$ without necessarily generating the intermediate uncompacted occlusion images $Odec_1$.

In the case shown in FIG. 15bis, the above operation is performed on the sequences $O_1$ and $Vsyn_1$ to obtain images of the second view $V_1$.

Of course, the occlusion spatial uncompactor DSO takes into account both the compaction direction and the repositioning order used by the spatial compactor for the occluded pixels at the coding stage. This ensures the obtainment of an uncompacted occlusion sequence $Odec_1$ which is analogous to the sequence $O_1$ obtained by starting from the second view $V_1$, i.e., with the occluded pixels in the positions in which they are located in the respective view. In the case of an embodiment of the compacted occlusion video sequence as shown in FIG. 4', i.e., wherein the occlusion repositioning order is the same as the compaction order, i.e., from left to right, the spatial compactor may perform, in a first and particularly simple embodiment thereof, a first step of horizontally inversing the decoded compacted occlusion images $OCdec_1$. This step can be carried out by inversely applying the transformation applied by the compactor, defined by the formula according to which the generic pixel p(i,j) of the non-inversed image 200 is equal to the pixel p'(i,m-j+1) of the horizontally inversed image 400', with $1 =< i <= n$ and $1 =< j <= m$. After having carried out said inverse transformation, the spatial uncompactor can execute the same operations already described for obtaining the sequence $Odec_1$ corresponding to the uncompaction of a compacted occlusion video sequence like the one shown in FIG. 4, i.e., with repositioning order of the occluded pixels from left to right.

Another embodiment of the occlusion spatial compactor CSO allows to obtain an input video sequence of the compacted occlusions with component images of m×n/2 size of the type shown in FIG. 7. In this case, the uncompactor DSO will first reconstruct an image like that shown in FIG. 6, obtained by constructing an output image of m×n size, in the first n/2 rows of which it will copy the first n/2 rows of the input image, and in the second n/2 rows of which it will copy the final n/2 rows, possibly already moved from right to left by the number of previous row pixels having a neutral value.

At this point, an image equivalent to that shown in FIG. 4 will have been obtained, and the uncompactor will be able to obtain the output video sequence of the uncompacted occlusions by executing the steps already described with reference to this latter Figure. If the compactor has executed the additional step of reducing the number of images by grouping pairs of m×n/2 images into single m×n images, then the uncompactor will initially have to execute the inverse step of decomposing the pairs of m×n/2 half-images of FIG. 7 contained in the m×n images of the input video sequence and copying their contents into the first n/2 rows of two complete m×n images, in which the second n/2 rows had initially taken a neutral value.

The spatial compactor may have executed, at the coding stage, the additional step of reducing the horizontal dimension of the images 700 that compose the occlusion sequence as shown in FIG. 8 in order to obtain the image 900 of m/2×n/2 size. In such a case, the uncompactor will first have to carry out the additional step of doubling the horizontal dimension of the image to generate an image of m×n/2 size, where it will enter the first m/4 columns of the input image into the first m/4 columns and the remaining m/4 columns of the input image into the last m/4 columns.

As usual, the pixels belonging to uncopied areas will take the preset value assigned to non-occluded pixels. If the compactor has additionally grouped sets of four m/2×n/2 images 900 into single m×n images, then the uncompactor will additionally have to, prior to the above-described step, decompose the four sub-images 900 contained in one m×n image of the input sequence into pairs of m×n images each comprising two sub-images of m×n/2 size 800 obtained by executing the operation inverse to that previously carried out, so as to switch from the image 800 to the image 900. Each one of said pairs of m×n images will in turn produce, by reiterating the decomposing step, a pair of m×n images, each containing one image 600 (FIG. 6), resulting in a total number of four output m×n images for each input m×n image 900 at the end of the image size expansion operations.

Figure 11:
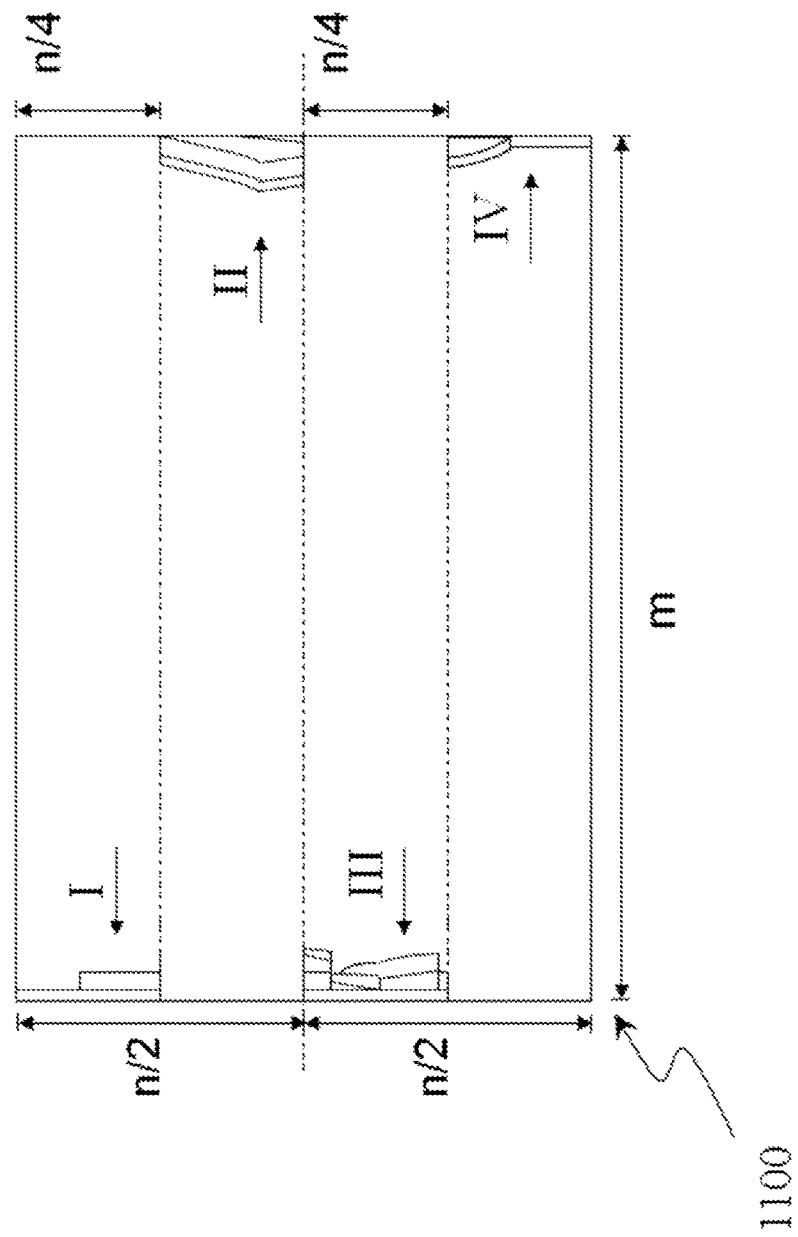
Figure 12:
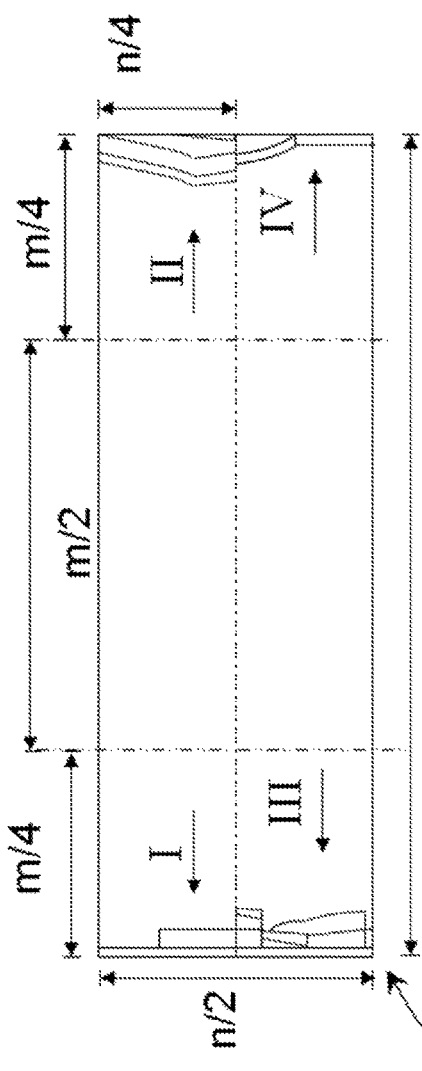
Figure 13:
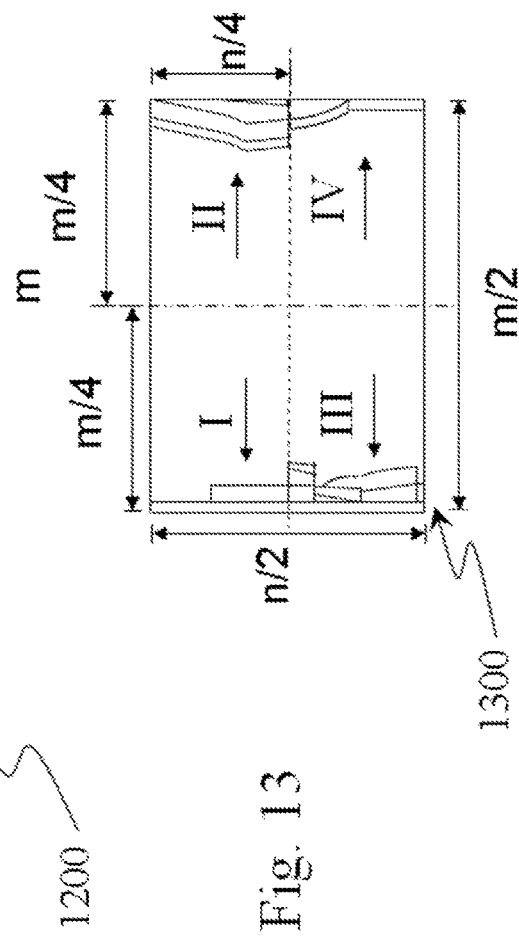

Similar considerations apply to the process for uncompacting the video sequences containing compacted occlusion images in accordance with any one of the modalities shown in FIGS. 11, 12 and 13; these images are obtained by using four compaction areas instead of two, with alternate compaction directions, and may have been or not halved in their vertical and/or horizontal dimensions. Again, in order to reconstruct the corresponding uncompacted occlusion images, the spatial uncompactor DSO can carry out the operations inverse to those executed on the coding side in the reverse order, starting from the last operation executed by the compactor and ending with the first one. In general, the uncompactor DSO can always reconstruct an uncompacted occlusion video sequence $Odec_1$, with occluded pixels positioned where they were placed by the occlusion estimator included in the encoder for the sequence $O_1$, without needing to receive the occlusion map sequence $OM_{0,1}$.

Referring back to the block diagram of the decoder 1500 (FIG. 15), the synthesized view $Vsyn_1$ and the uncompacted occlusion sequence $Odec_1$ are appropriately merged to form the view $Vdec_1$ to be presented to the display, by appropriately combining, pixel by pixel, the images of the sequence $Odec_1$ containing the values of the pixels of the occluded regions for the view $V_1$ and the temporally corresponding images of the view $Vsyn_1$, which contains the values of the synthesized pixels of the same view lacking valid values for the occluded pixels, which may, for example, contain a null value.

In a simpler case, the synthesized view and the occlusions are simply added up in the matrix direction, so that the occlusions will occupy the positions of those pixels that the synthesis algorithm was not able to estimate. In order to improve the quality of the reconstructed image, it may be useful to adopt filtering techniques adapted to reduce the artifacts created in discontinuity areas between synthesized pixels and decoded occluded pixels when mounting the synthesized view and the occluded areas. This operation is carried out by the optional combination artifact compensation block CART, which is located downstream of the adder and may consist of suitable prior-art numerical filters. In particular, a smoothing (or low-pass) filtering technique may be adopted along the discontinuities between occluded and non-occluded areas.

The decoder 1500 will thus have reconstructed the two original views $V_0$ and $V_1$, which may then be used by a reproduction device to display the video stream in three-dimensional mode in accordance with any stereoscopic technique.

In order to be able to correctly reconstruct the video sequence comprising the occlusion images, i.e., with the positions of the occluded pixels determined by the respective map on the coding side, it is necessary that the uncompactor knows the modes in which the compaction process was carried out.

In particular, such modes may relate to:
- the number of compaction areas, which may be an integer number greater than or equal to 1;
- the compaction direction used in a given compaction area, which may be either from left to right or from right to left, or, more concisely, to the right or to the left;
- the order of scanning or positioning of the occluded pixels in a given area, which may also be either to the right or to the left;
- the horizontal size reduction, i.e., the parameters that allow determining which non-occluded pixels have been eliminated in the rows of the non-occluded image;
- the vertical size reduction, i.e., the parameters that allow determining if and how many times the operation of vertically compacting the occlusions has been executed by moving the occluded pixels into the upper compaction area and removing from the image the compaction area that contained the occluded pixels;
- the possible presence of buffer areas and the characteristics thereof In general, these modes may vary from one image to another within a compacted occlusion video sequence. For simplicity, let us assume that they are constant within one video sequence or one part thereof.

Various scenarios are conceivable as concerns how to communicate said modes to the uncompactor. In a first scenario, a specific compaction mode may be defined once for all, which will always be applied by default to any sequence by any compactor. In such a case, the uncompactor will know such mode and will only have to carry out the corresponding uncompaction operations.

If this hypothesis is not verified, then the compactor may use different compaction modes, e.g., a smaller or greater number of compaction areas, different compaction directions and orders, etc., depending on the input occlusion video sequence. In such a case, the uncompactor can determine the compaction mode in two different ways. In a first approach, the uncompactor analyzes the images of the compacted occlusions $OCdec_1$, possibly comparing them with the corresponding ones of the sequence $OM_{0,1}$, and thus determines a posteriori the compaction modes used on the coding side. This solution offers the advantage of not requiring the transmission of any compaction parameters, while however implying higher computational costs for the uncompactor, which might also make wrong analyses or anyway very complex ones.

In a second approach, the operating parameters can be added by the compactor or can be communicated by the same to the standard video encoder, which can then enter them by whatever means into the coded video stream $OCcod_1$. This can be done either by using data reserved for future applications and already included in current video coding standards, or by using existing or newly defined fields included in video stream container formats, such as, for example, DVB transport stream, Matroska, etc., which comprise the VDO signal triplet.

In a particularly refined embodiment, the compactor may execute multiple compaction tests in different modes, possibly taking into account the characteristics of the occlusions (e.g., number of occluded pixels, and spatial and temporal distribution thereof) present in the video sequence. For each mode thus tested, the associated bit rate is calculated by subsequently decoding and reconstructing the associated view; finally, the most effective compaction mode resulting from the tests is applied. This technique is particularly advantageous when the coding and decoding processes are delayed, when there are no particular requirements in terms of coding speed, and also for video sequences for which the priority is to reduce as much as possible the bit rate required for transmission and/or storage.

The present invention was tested on a video sequence used for 3D video coding experiments. The stereoscopic sequence called "book arrival" was used, made available to the scientific community for experimentation and research purposes by the Fraunhofer Heinrich Hertz Institut. Video resolution was 1024×768, with 16.67 Hz frequency. In all tests carried out, 300 frames of two stereoscopic views were coded. For the sequences in use, depth maps were also made available, estimated by a suitable algorithm.

FIGS. 16 to 22 illustrate the tests carried out.

Figure 16:
FIGS. 16 to 21 show examples of real images obtained during tests carried out by applying the principles of the present invention.

FIG. 16 shows an image of one of the views, designated V, taken from said stereoscopic sequence.

Figure 17:

FIG. 17 shows a full-size depth map of the image of FIG. 16, belonging to the respective sequence, designated D, at full dimension.

Figure 18:
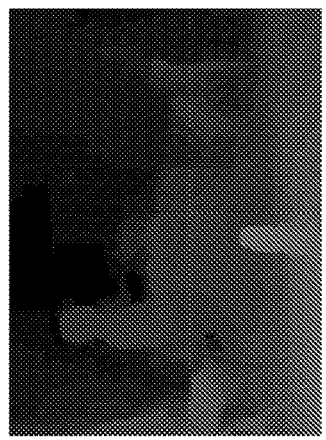

FIG. 18 shows the same map image of FIG. 17 undersampled to 50% both horizontally and vertically; the corresponding sequence is designated D/2.

Figure 19:
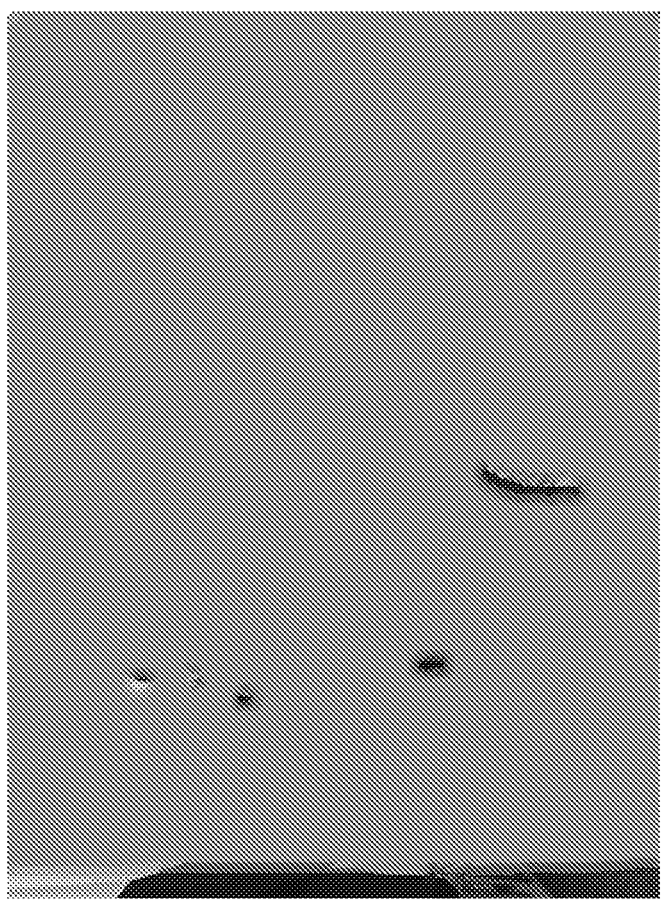

FIG. 19 shows the occlusion image relating to the image of FIG. 16 in uncompacted form, resulting from the synthesis algorithm starting from V and D. The respective video sequence resulting therefrom is designated O. In the tests, the intermediate gray value was selected to represent the non-occluded pixels belonging to the neutral area. Only the occluded pixels are shown in this image, while the remaining part of the image is set to fixed and predetermined luminance and chrominance values, e.g., 0 or 128. Note that the fraction of occluded pixels present therein is nonetheless very small compared to the total number of pixels in one row of the image.

Figure 20:
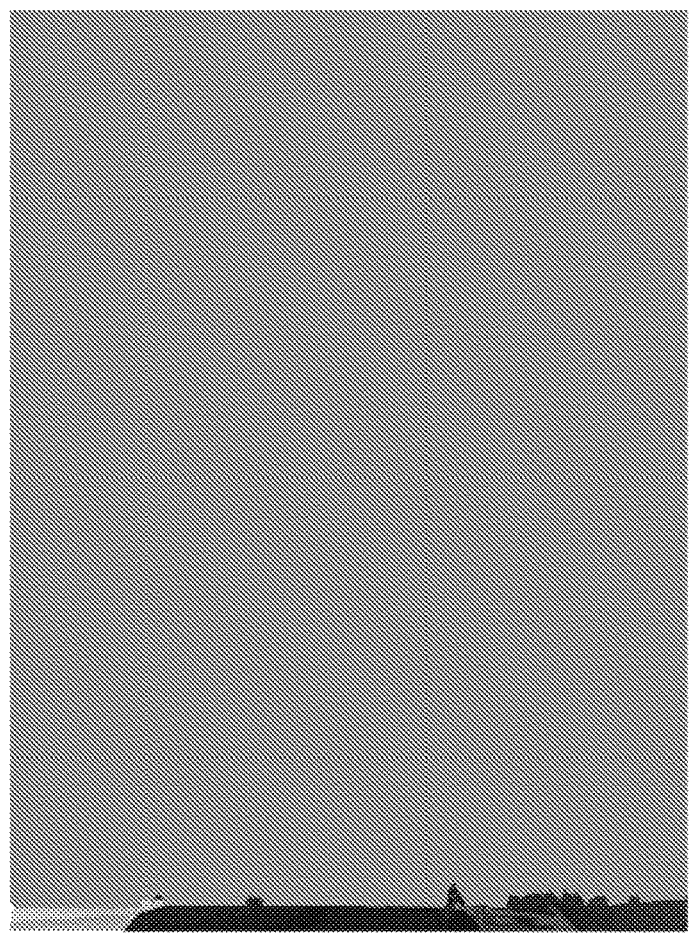

FIG. 20 illustrates one image of the compacted occlusion video sequence O* still corresponding to the view image of FIG. 16, in which a single compaction area on the left was used with repositioning order from left to right, with no horizontal or vertical size reduction. In substance, this is the simplest embodiment of the invention of a compacted occluded image, as shown in FIG. 4. This embodiment, like all those with no horizontal or vertical size reduction, is especially advantageous in the case wherein the maximum number of occluded pixels of a generic row of the image is smaller than or at most equal to the number m of pixels of the row of the image of the video sequence $V_0$, in that this ensures the presence of all the occluded pixels in the compacted occlusion sequence.

Figure 21:
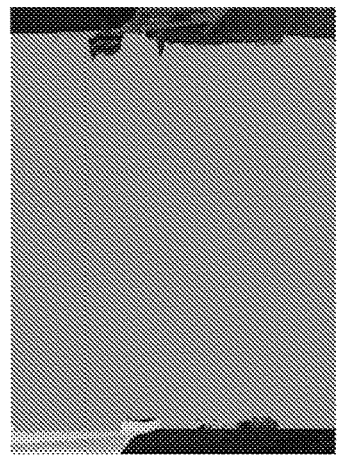

FIG. 21 shows the reduced-dimension compacted occlusion image belonging to the respective sequence designated O/2*, obtained for the same non-occluded image of FIG. 19 by applying the compaction modes represented in FIGS. 6 to 9, i.e., in the presence of two compaction areas, the upper one to the left and the lower one to the right, with the occlusions orderly repositioned to the right in the first area and to the left in the second area, and with horizontal and vertical size reductions, both by a factor 2.

Three tests were carried out for coding and decoding this test signal. In the first test, which was used as a reference, V, D/2 and O, i.e., the video sequences of the main view, of the depth map undersampled to 50%, and of the non-compacted occlusion image (i.e., with the values of the occluded pixels in their original positions), respectively, were coded and decoded. The second test used V, D/2 and O*, i.e., the video sequences of the main view, of the depth map undersampled to 50%, and of the compacted occlusion images, respectively. The third test involved the sequences V, D and O*/2, i.e., the video sequences of the main view, of the non-undersampled depth map, and of the compacted occlusion images reduced by a factor of ½ both horizontally and vertically, respectively. For all tests, a standard H.264 AVC encoder was used for coding all the sequences with a constant quality parameter QP. In order to obtain various coding bit rates, several experiments were carried out with different QP's. The view synthesis algorithm was specially developed in accordance with the state of the art. It receives an input video signal and the associated depth map, and estimates a video obtained from a new viewpoint horizontally displaced with respect to the original video. It uses no strategy for resolving the occlusions, such as, for example, inpainting techniques, and outputs the synthesized video and the occlusion map.

Figure 22:
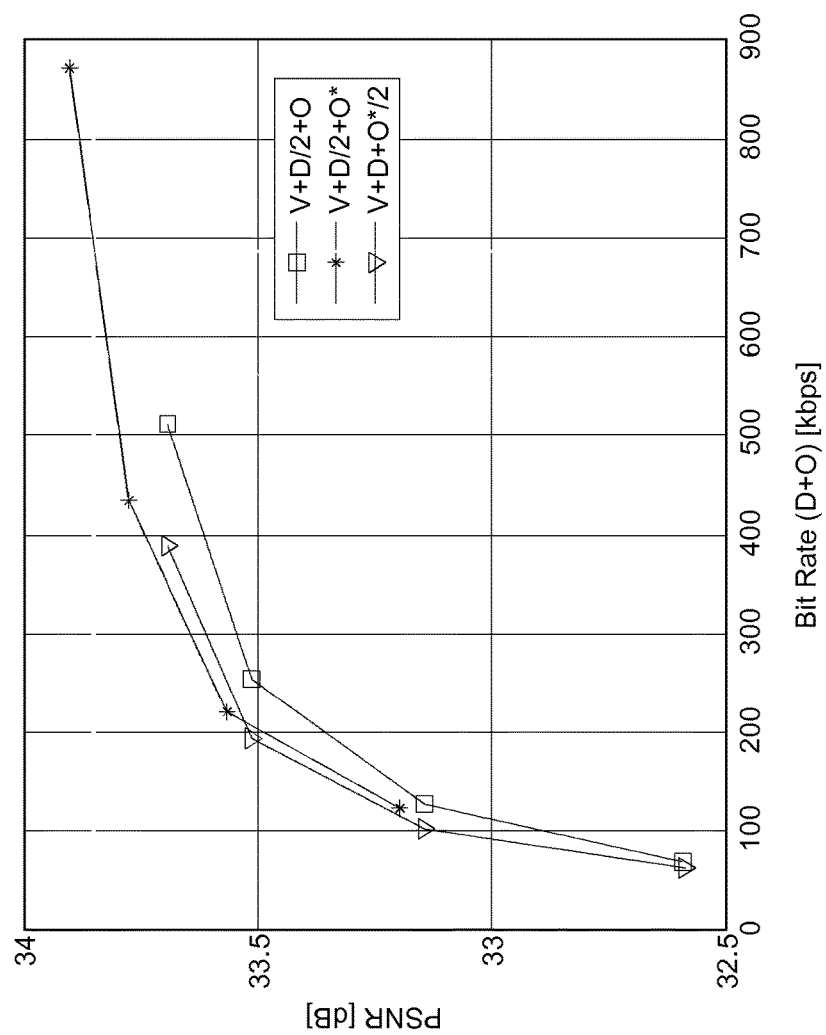
FIG. 22 shows curves of peak noise-to-signal ratios obtained during said tests carried out by applying the principles of the present invention.

FIG. 22 shows the curves of the peak signal-to-noise ratio (PSNR) in dB resulting from the coding and decoding tests carried out on the test sequence with respect to the bit rate used for coding the sequences D and O. The Figure shows that the coding efficiency is higher when using video sequences of compacted occlusion images O* and O*/2 than when O is used. This is true independently of whether an undersampled version of the depth map is used or not. The compaction step, with possible size reduction, does not impair the efficiency of the video coding process; instead, it improves it, so that it is possible to spatially compact in both directions the sequence of the occlusion images, which may also be combined together with other images into a higher-resolution image when, as usually happens, the occluded pixels in a generic row are just a small part of the total number.

The above-described embodiment example may be subject to variations without departing from the protection scope of the present invention, including all embodiments equivalent for a man skilled in the art.

The present invention is also applicable to more than 2 views. A non-limiting example of embodiment of a generator of three-dimensional streams with more than two views when coding is used, i.e., an extension of the stereoscopic generator diagram of FIG. 1, is shown in FIG. 1ter. In this case as well, on the generation side an encoder ENC codes the main view and depth $V_0$ and $D_0$, which are used for synthesizing a number k−1 of views $V_1$, $V_2$, $V_{k-1}$. Such views can be sorted according to a certain criterion, e.g. based on the distance from the main view, and for each of them it is possible to implicitly find, by starting from the estimated sequences of the views $V_1, \ldots, V_{k-1}$, respectively designated $Vsyn_1, \ldots, Vsyn_{k-1}$, the position of the occluded pixels $OM_{0,1}, OM_{0,2}, \ldots, OM_{0,k-1}$ relative to the main view $V_0$. Such pixels, available on the transmission side from the multi-view acquisition system, will be collected and compacted row by row by an occlusion spatial compactor block CSO, by applying one of the compaction criteria described in the above paragraphs to the images of the occluded pixels $O_1 \ldots O_{k-1}$. Prior to compaction, the module CSO will combine the k−1 images of the occluded pixels by placing them side by side as shown in FIG. 2bis. This will generate a single sequence of compacted occlusion frames $OC_1, \ldots, _{k-1}$ for all alternative views, which will be transmitted or stored together with $V_0$ and $D_0$ and used on the reconstruction side to fill the occluded areas of the synthesized views.

The reconstruction process follows the diagram shown in FIG. 15ter, which represents an extension of the 2-view reconstructor of FIG. 15, still applied to the non-limiting case wherein coding and decoding operations are carried out. The differences therefrom are the following:
  the synthesis block SIV carries out the synthesis by starting from $V_0$ and $D_0$ of the k−1 alternative views $V_1$, $V_2$, $V_{k-1}$;
  the occlusion spatial uncompactor block DSO performs the task of repositioning the occluded pixels into the corresponding position and view, by observing the view order defined on the generation side, and outputs the uncompacted occlusion images $Odec_1, \ldots Odec_{k-1}$.

Finally, the artifact compensation block CART is independently applied to the k−1 reconstructed synthesized views obtained by combining the uncompacted occlusions with the synthesized views $Vsyn_1, \ldots Vsyn_{k-1}$ received from the synthesis module SIV.

In the particular case of a stereoscopic video, i.e., a video signal having two views, the present invention can be used in order to implement a video transmission system that can be made backward-compatible by entering the left view, the depth map and the occlusions into a single frame through the use of frame packing arrangement strategies. For example, it is possible to use the tile format to send the left view in 720p format and the depth map undersampled by a factor of 2 in the lower right corner of the tile format; the occlusion image re-organized in accordance with the present invention can be entered as a right view of the tile format. Alternatively, one may use the full-resolution depth map and enter the occlusions in the lower right corner by exploiting the size reduction of the occlusion images as shown in FIGS. 9 and 21.

If an encoder is used in order to reduce the bit rate required for representing the stereoscopic content, the present invention requires that the coding of the left view and of the depth map be carried out prior to the coding of the occlusions. The latter, in fact, must be calculated on the basis of the decoded left view and depth map. This poses a technical problem when using transport formats of the frame packing type that reuse a standard coding and transmission chain operating in real time. In this case, it is not possible to construct a single image including video, depth and occlusions relating to the same time instant, unless occlusion estimation errors can be tolerated. This problem can be solved by introducing a one-image delay when creating the occlusion image. The left view and the depth thereof are coded, with a frame packing approach, at time $t_0$. After having been decoded, such information is used on the coding side to calculate the occlusions at time $t_0$. Such occluded information is however sent in frame packing mode at a time $t_1$ later than $t_0$. This means that at time $t_1$ a composite frame will be built on the coding side, which will contain the left view, the depth map at time $t_1$ and the occlusion image at time $t_0$. By following this procedure, the decoder will be able to reconstruct the stereoscopic video with a delay of one frame, which is not however a problem, since it is very short (of the order of hundreds of a second) and cannot therefore be perceived by a viewer. Furthermore, it is only a minimal part of the delay introduced by the video stream decoding operations. It must be pointed out that the times $t_0$, $t_1$, $t_2$ relate to the coding order of modern compression standard, which may in general be different from the display time of the same images.

It has been described above the implementation of the present invention in the case of V+D+O three-dimensional video coding, i.e., using three video sequences comprising main view, depth map and occlusions. It can however be used for any type of video coding using a disparity map, such as, for example, a video coding using a view, a disparity map and an occlusion sequence.

The method for obtaining the disparity map of the second view $V_1$ with respect to the first view $V_0$ is per se known. In this case, the "View Synthesis" function of the block STOC (FIG. 1) will produce the estimated sequence of the view $V_1$ by employing another suitable synthesis algorithm, per se known, which uses the disparity map instead of the depth map.

The assumption has been made in the present description that standard video encoders and decoders should be used to ensure the utmost compatibility with the video processing, storage and transmission devices and infrastructures currently in use. However, this does not exclude the possibility of applying the invention also to video coding and decoding systems employing non-standard encoders and decoders optimized for particular types of video processing.

It has been underlined several times in this description that it is better to avoid subjecting the occlusion images to size reductions that may imply losses of occluded pixels; if removed during such reductions, in fact, the spatial uncompactor will not be able to obtain them from the compacted occlusion images. It may occur that, for a given, and typically limited, quantity of images of the video sequence to be coded, the number of occluded pixels is such that they are removed by the size reduction operations carried out by the spatial compactor. This loss can often be tolerated and produces artifacts which are scarcely or not at all perceivable by the viewer, in that the occluded areas typically cover very small areas. Furthermore, the optional combination artifact compensation block included in the decoder can often fill the voids left by occluded pixels removed during the coding process, by using the video information of adjacent image areas and suitable video processing techniques. It is therefore conceivable that the compactor decides to apply a certain size reduction to the occlusion sequence without verifying whether it will cause losses of occluded pixels in its compacted representation that will be transmitted to the decoder, or at least that it will make such verification for only a limited and predefined part thereof.

The verification may be limited, for example, to the initial part of the sequence, and then the whole occlusion video sequence may be subjected to the maximum size reduction that does not cause losses of occluded pixels, without worrying about the fact that it may cause such losses in some other parts of the sequence.

The present invention can advantageously be implemented through computer programs comprising coding means for implementing one or more steps of the above-described methods, when such programs are executed by computers. It is therefore understood that the protection scope extends to said computer programs as well as to computer-readable means that comprise recorded messages, said computer-readable means comprising program coding means for implementing one or more steps of the above-described methods, when said programs are executed by computers. Further embodiment variations are possible to the non-limiting examples described, without departing from the scope of the invention, comprising all the equivalent embodiments for a skilled in the art.

The elements and characteristics described in the various forms of preferred embodiments can be mutually combined without departing from the scope of the invention.

The advantages deriving from the application of the present invention are apparent.

The present invention allows to efficiently compress a stereoscopic video in V+D+O format by using current video compression techniques. The innovative elements of the technique consist of an occlusion position representation not requiring to be explicitly coded and sent to the decoder, and a reorganization of the occluded pixels to form an image that facilitates the subsequent compression carried out by using standard techniques. The technique proposed herein, furthermore, does not depend on a particular intermediate view synthesis algorithm, and can be easily adapted to the technologies that will become available in the near future. Finally, the present invention ensures backward compatibility with 2D systems, while at the same time allowing generalization for multi-view transmission for self-stereoscopic displays.

From the above description, those skilled in the art will be able to produce the object of the invention without introducing any further construction details.

The invention claimed is:

1. A method for generating a three-dimensional video stream by starting from a sequence of video images, said sequence comprising a first view ($V_0$), at least one second view ($V_1$) of a scene, as well as a depth map ($D_0$) of said first view ($V_0$), or a disparity map of said at least one second view ($V_1$) with respect to the first view ($V_0$), the method comprising, for one image:

obtaining at least one occlusion image ($O_1$) comprising the occluded pixels of said second view ($V_1$) by starting from said depth map ($D_0$) or from said disparity map;

generating a compacted occlusion image ($OC_1$) by spatially repositioning said occluded pixels of said at least one occlusion image ($O_1$), by moving said occluded pixels spatially closer to one another with respect to their positions in said occlusion image;

said three-dimensional video stream comprising, for one image, said first view ($V_0$), said depth map ($D_0$) or said disparity map, and said at least one compacted occlusion image ($OC_1$), wherein said at least one compacted occlusion image (OC1) of said at least one second view (V1) is obtained by:

determining at least one first occlusion map (OM0,1) of at least one first estimated sequence (Vsyn1) of said at least one second view (V1) by starting from decoded values (Vdec0, Ddec0) of said first view (V0) or by starting from said first view (V0) and from said depth map (D0) corresponding to said first view (V0), said first occlusion map (OM0,1) comprising a representation of the positions of said occlusions;

determining said at least one occlusion image (O1) having values corresponding to those of said at least one second view (V1) of the image in positions corresponding to those of the occlusions represented in said at least one first occlusion map (OM0,1);

determining a spatial compaction of said at least one occlusion image (O1) for said positions corresponding to those of the occlusions represented in said at least one occlusion map (OM0,1), thus obtaining said at least one compacted occlusion image (OC1) of said at least one second view (V1).

2. The method according to claim 1, wherein said spatial compaction is obtained by moving occlusion pixels of said at least one occlusion image ($O_1$), which are located in said positions corresponding to those of the occlusions represented in said at least one occlusion map ($OM_{0,1}$), towards one or more sides of the images of said at least one occlusion image ($O_1$).

3. The method according to claim 2, wherein said occlusion pixels are moved row by row towards one of the sides of the image of said at least one first video sequence ($O_1$), said movement occurring by removing intermediate pixels of said at least one occlusion image ($O_1$) which do not correspond to occlusion positions, while preserving the relative sequence of the occlusion pixels row by row or reversing it horizontally.

4. The method according to claim 2, wherein said occlusion pixels are moved row by row towards both sides of the image of said at least one occlusion image ($O_1$) towards a first side for a first group of rows and towards a second side for a second group of rows of the images of said at least one occlusion image ($O_1$) by removing intermediate pixels of said at least one occlusion image ($O_1$) which do not correspond to occlusion positions, said first group and second group of rows being either adjacent or alternate rows.

5. The method according to claim 2, wherein said occlusion pixels are moved row by row towards both sides of the image of said at least one occlusion image ($O_1$) the pixels of a first group of rows being moved towards a first side of the image in said first group of rows, and the pixels of a second group of rows being moved towards a second side of the image in said first group of rows of the images of said at least one occlusion image ($O_1$), by removing intermediate pixels of said at least one occlusion image ($O_1$) which do not correspond to occlusion positions, and leaving said second group of rows free from pixels.

6. The method according to claim 5, wherein said second group of rows is removed from said image of said at least one occlusion image ($O_1$) by reducing the size of said image.

7. The method according to claim 5, wherein a group of columns (m/2) of said image of said at least one occlusion image ($O_1$) unoccupied by said occlusion pixels is removed from said image of said at least one occlusion image ($O_1$), thereby reducing the size of said image.

8. The method according to claim 1, wherein, in the presence of multiple occlusion areas in the image of said at least one occlusion image ($O_1$), said occlusion pixels are positioned sequentially by removing pixels of said at least one occlusion image ($O_1$) which do not correspond to occlusion positions.

9. The method according to claim 1, wherein, in the presence of multiple occlusion areas in the image of said at least one occlusion image ($O_1$), said occlusion pixels are positioned sequentially by placing buffer pixels between pixels of different occlusion areas.

10. The method according to claim 9, wherein said buffer pixels have values which are calculated in a manner such as to decrease the gap in the signal level between two neighboring occlusion areas, and/or between one occlusion area and an adjacent neutral area with no occlusions, by introducing intermediate transition zones between pixels of different occlusion areas.

11. The method according to claim 1, comprising the generation of a sequence of coded images ($Vcod_0$, $Dcod_0$, $OCcod_0$), wherein the coded images comprise the coding of said first view ($V_0$), of said depth map ($D_0$) or of said disparity map, and of said at least one compacted occlusion image ($OC_1$).

12. A device for generating a three-dimensional video stream by starting from a sequence of video images, said sequence comprising a first view ($V_0$), at least one second view ($V_1$) of a scene, as well as a depth map ($D_0$) of said first view ($V_0$), or a disparity map of said at least one second view ($V_1$) with respect to the first view ($V_0$), the device comprising:

a three-dimensional video stream generator, the three-dimensional video stream generator configured to:

obtain said at least one occlusion image ($O_1$) comprising the occluded pixels of said at least one second view ($V_1$) by starting from a depth map ($D_0$) of said first view ($V_0$), or from a disparity map of said at least one second view ($V_1$) with respect to the first view ($V_0$);

generate said at least one compacted occlusion image ($OC_1$) by spatially repositioning said occluded pixels of said at least one occlusion image ($O_1$) by moving said occluded pixels spatially closer to one another with respect to their positions in said occlusion image;

obtain said three-dimensional video stream comprising, for one image, sad first view ($V_0$), said depth map ($D_0$) or said disparity map, and said at least one compacted occlusion image ($OC_1$), wherein said three-dimensional video stream generator is configured to generate said at least one compacted occlusion image (OC1) by:

determining said at least one first occlusion map (OM0, 1) of said at least one first estimated sequence (Vsyn1) of said at least one second view (V1) by starting from said decoded values (Vdec0, Ddec0) of said first view (V0) or by starting from said first view (V0) and from said depth map (D0) corresponding to said first view (V0), said first occlusion map (OM0, 1) comprising a representation of the positions of said occlusions;

determining said at least one occlusion image (O1) of images having values corresponding to those of said at least one second view (V1) of the image in positions corresponding to those of the occlusions represented in said at least one first occlusion map (OM0,1);

determining said spatial compaction of said at least one occlusion image (O1) for said positions corresponding to those of the occlusions of said at least one occlusion map (OM0,1), thus obtaining said at least one compacted occlusion image (OC1) of said at least one second view (V1).

13. The device according to claim 12, wherein said three-dimensional video stream generator is also configured to generate a sequence of coded images (Vcod$_0$, Dcod$_0$, OCcod$_0$), wherein the coded images comprise the coding of said first view (V$_0$), of said depth map (D$_0$) or of said disparity map, and of said at least one compacted occlusion image (OC$_1$).

14. A method for reconstructing a three-dimensional video stream comprising a sequence of video images, comprising, for one image:

receiving a first view (Vdec$_0$, V$_0$) of said sequence of video images, a depth map (Ddec0, D$_0$) of said first view (Vdec$_0$, V$_0$), or a disparity map between said first view (Vdec$_0$, V$_0$) and at least one second view (Vdec$_1$, V$_1$) of said sequence of video images, and at least one compacted occlusion image (OCdec$_1$, OC$_1$) obtained by spatially repositioning the occluded pixels of at least one occlusion image (O$_1$) of said at least one second view (Vdec$_1$),by moving said occluded pixels spatially closer to one another with respect to their positions in said occlusion image;

obtaining at least one reconstructed occlusion image (Odec$_1$, (O$_1$) comprising the occluded pixels of said at least one second view (Vdec$_1$, V$_1$) repositioned in the position they were in prior to the compaction operation carried out in order to obtain said at least one compacted occlusion image (OC$_1$);

reconstructing said at least one second view (Vdec$_1$, V$_1$) by starting from said first view (Vdec$_0$, V$_0$), from said depth map (Ddec$_0$, D$_0$) or, respectively, from said disparity map, and from said at least one reconstructed occlusion image (Odec$_1$, O$_1$);

said reconstructed three-dimensional stream comprising said received first view (Vdec$_0$, V$_0$) and said at least one reconstructed second view (Vdec$_1$,V$_1$), wherein said at least one second view (Vdec1, V1) is reconstructed by:

determining at least one second estimated sequence (Vsyn1) of said at least one second view (Vdec1, V1) by using values obtained from said first view (Vdec0, V0) and from said depth map (Ddec0, D0), wherein said at least one second estimated sequence (Vsyn1) is adapted to comprise occlusion areas;

determining at least one second occlusion map (OM0,1) of said at least one second estimated sequence (Vsyn1), said occlusion map (OM0,1) comprising a representation of the positions of the occlusions;

spatially uncompacting the compacted occlusions of said at least one compacted occlusion image (OCdec1, OC1) in order to obtain at least one second occlusion image (Odec1, O1) comprising an uncompacted occlusion image, by restoring the actual original positions of said occlusions of said at least one second view (Vdec1, V1) by spatially repositioning said occluded pixels of said at least one compacted occlusion image by moving said occluded pixels away one from the other with respect to their position in the compacted occlusion image, based on the positions represented in the occlusion map (OM0,1);

replacing the pixels of the occlusion positions of said at least one second occlusion image (Odec1) in corresponding positions of said at least one second estimated sequence (Vsyn1), while leaving the other positions of said at least one second estimated sequence (Vsyn1) unchanged, thus obtaining at least one second view (Vdec1, V1).

15. The method according to claim 14, wherein said at least one second view (Vdec$_1$) is subjected to a combination artifact compensation operation.

16. The method according to claim 14, comprising the decoding of a sequence of coded images (Vcod$_0$, Dcod$_0$, OCcod$_0$), wherein the coded images comprise the coding of said first view (V$_0$), of said depth map (D$_0$) or of said disparity map, and of said at least one compacted occlusion image (OC$_1$), thus obtaining said first view (Vdec$_0$) from said depth map (Ddec$_0$) or, respectively, from said disparity map, and said at least one compacted occlusion image (OCdec$_1$).

17. A device for reconstructing a three-dimensional video stream comprising a sequence of video images, said device comprising:

a three-dimensional video signal reconstructor, the three-dimensional video signal reconstructor configured to:

receive a first view (Vdec$_0$, V$_0$) of said sequence of video images, a depth map (Ddec$_0$, D$_0$) of said first view (Vdec$_0$, V$_0$), or a disparity map between said first view (Vdec$_0$, V$_0$) and at least one second view (Vdec$_1$, V$_1$) of said sequence of video images, and at least one compacted occlusion image (OCdec$_1$, OC$_1$) obtained by spatially repositioning the occluded pixels of at least one occlusion image (O$_1$) of said at least one second view (Vdec$_1$), moving said occluded pixels spatially closer to one another with respect to their positions in said occlusion image;

obtain said at least one reconstructed occlusion image (Odec$_1$, O$_1$) by repositioning said occluded pixels of said at least one second view (Vdec$_1$, V$_1$) in the position they were in prior to the compaction operation carried out in order to obtain said at least one compacted occlusion image (OC$_1$);

reconstruct said at least one second view (V$_{dec1}$, V$_1$) by starting from said first view (Vdec$_0$, V$_0$), from said depth map (Ddec$_0$, D$_0$) or, respectively, from said disparity map, and from said at least one reconstructed occlusion image (Odec$_1$, o$_1$), wherein said three-dimensional video signal reconstructor is configured to reconstruct said at least one second view (Vdec1, V1) by:

obtaining said at least one second estimated sequence (Vsyn1) of said at least one second view (Vdec1, V1) by using values obtained from said first view (Vdec0, V0) and from said decoded depth map (Ddec0, D0), wherein said at least one second estimated sequence (Vsyn1) may comprise occlusion areas;

determining said at least one second occlusion map (OM0,1) of said at least one second estimated sequence (Vsyn1), said occlusion map (OM0,1) comprising a representation of the positions of the occlusions;

spatially uncompacting said compacted occlusions of said at least one compacted occlusion image (OCdec1, OC1) in order to obtain said at least one second occlusion image (Odec1, O1) comprising an uncompacted occlusion image, based on the position of the occlusions represented in said at least one occlusion map (OM0,1), by restoring the actual original positions of said occlusions of said at least one second view (Vdec1, V1) by spatially repositioning said occluded pixels of said at least one compacted occlusion image by moving said occluded pixels away one from the other with respect to their position in the compacted occlusion image;

replacing the pixels of the occlusion positions of said at least one second occlusion image (Odec1) in corresponding positions of said at least one second estimated sequence (Vsyn1), while leaving the other positions of said at least one second estimated sequence (Vsyn1) unchanged, thus obtaining said at least one second view (Vdec1, V1).

18. The device according to claim 17 wherein said three-dimensional video signal reconstructor is also configured to decode said sequence of coded images, by coding of said first view ($V_0$), of said depth map ($D_0$) or of said disparity map, and of said at least one compacted occlusion image ($OC_1$), in order to obtain said first view ($Vdec_0$) from said depth map ($Ddec_0$) or, respectively, from said disparity map, and said at least one compacted occlusion image ($OCdec_1$).

19. The device according to claim 17, comprising a combination artifact compensation block (CART) for said at least one reconstructed second view ($Vdec_1$).

20. A method for generating a three-dimensional video stream by starting from a sequence of video images generated according to claim 1, wherein said at least one second view ($V_1$) comprises (k−1) views ($V_1, \ldots V_{k-1}$), where k>1 and integer, the method comprising, for one image:

establishing an order of the views ($V_0, V_1, \ldots, V_{k-1}$) comprising said first view ($V_0$) as a main view;

obtaining (k−1) occlusion images ($O_1, \ldots O_{k-1}$,), each comprising the occluded pixels of one of said second views ($V_1, \ldots V_{k-1}$) with the corresponding index, by starting from said depth map ($D_0, D_{dec0}$) or said disparity map and from said main view ($V_0, V_{dec0}$);

generating (k−1) compacted occlusion images ($OC_{1,2,k-1}$, $OCcod_{1,2,\ldots k-1}$) by spatially repositioning said occluded pixels of said (k−1) occlusion images ($O_1, \ldots O_{k-1}$), so as to move the respective pixels closer to one another;

said three-dimensional video stream comprising, for one image, said first view ($V_0$), said depth map ($D_0$) of said first view ($V_0$), and said compacted occlusion images ($OC_{1,2,k-1}$, $OCcod_{1, 2, \ldots k-1}$).

21. A device for generating a three-dimensional video stream by starting from a sequence of video images, said sequence comprising a first view ($V_0$) and at least one second view ($V_1$) of a scene, wherein said at least one second view ($V_1$) comprises (k−1) views ($V_1, \ldots, V_{k-1}$), where k >1 and integer, the device comprising said three-dimensional video stream generator as in claim 1 also configured to:

establish an order of the views (V0, V1, ..., Vk−1) comprising said first view (V0) as a main view;

obtain (k−1) occlusion images (O1, ... Ok−1,), each comprising the occluded pixels of one of said second views (V1, ... Vk−1) with the corresponding index, by starting from said depth map (D0, Ddec0) or said disparity map and from said main view (V0, Vdec0);

generate (k−1) compacted occlusion images (OC1,2,k−1, OCcod1,2, ... k−1) by spatially repositioning said occluded pixels of said (k−1) occlusion images (O1, ... Ok−1), so as to move the respective pixels closer to one another;

said three-dimensional video stream comprising, for one image, sad first view (V0), said depth map (D0) of said first view (V0), and said compacted occlusion images (OC1,2,k−1, OCcod1,2, ... k−1).

22. The method for reconstructing a three-dimensional video stream comprising a sequence of video images reconstructed according to claim 14, wherein said at least one second view ($V_1$) comprises (k−1) views ($V_1, \ldots, V_{k-1}$), where k>1 and integer, and compacted occlusion images ($OC_{1,2,\ldots k-1}$, $OCcod_{1, 2, \ldots k-1}$) obtained by spatially repositioning the occluded pixels of the occlusion images ($O_1, \ldots O_{k-1}$) of said (k−1) views ($V_1, \ldots V_{k-1}$), so as to move said pixels spatially closer to one another, the method comprising, for one image:

obtaining (k−1) reconstructed occlusion images ($Odec_1, \ldots Odec_{k-1}; O_1, \ldots O_{k-1}$) comprising the occluded pixels of said k−1 views ($V_1, \ldots, V_{k-1}$) repositioned in the position they were in prior to the compaction operation carried out in order to obtain said compacted occlusion images ($OCdec_{1, 2, \ldots k1}$, $OC_{1,2,\ldots k-1}$);

reconstructing said (k−1) views ($V_1, \ldots, V_{k-1}$) by starting from said first view ($Vdec_0, V_0$), from said depth map ($Ddec_0, D_0$) or, respectively, from said disparity map, and from said reconstructed occlusion images ($Odec_1, \ldots Odec_{k-1}; O_1, \ldots O_{k-1}$);

said reconstructed three-dimensional stream comprising said received first view ($Vdec_0, V_0$) and said (k−1) reconstructed views ($Vdec_1, \ldots Vdec_{k-1}, V_1, \ldots, V_{k-1}$).

23. The device for reconstructing a three-dimensional video stream comprising a sequence of video images, as in claim 17, wherein said at least one second view ($V_1$) comprises (k−1) views ($V_1, \ldots, V_{k-1}$), where k>1 and compacted occlusion images ($OC_{1,2,\ldots k-1}$, $OCcod_{1,2,\ldots k-1}$) obtained by spatially repositioning the occlusion images ($O_1, \ldots O_{k-1}$) of said (k−1) views ($V_1, \ldots V_{k-1}$), so as to move said pixels spatially closer to one another, said three-dimensional video signal reconstructor being also configured to:

obtain (k−1) reconstructed occlusion images($Odec_1, \ldots Odec_{k-1}; O_1, \ldots O_{k-1}$); comprising the occluded pixels of said k−1 views ($V_1, \ldots V_{k-1}$) repositioned in the position they were in prior to the compaction operation carried out in order to obtain said compacted occlusion images (OCdec1,2, ... k−1, OC1,2, ... k−1);

reconstruct said (k−1) views ($V_1, \ldots, V_{k-1}$) by starting from said first view ($Vdec_0, V_0$), from said depth map ($Ddec_0, D_0$) or, respectively, from said disparity map, and from said reconstructed occlusion images ($Odec_1, \ldots Odec_{k-1}; O_1, \ldots O_{k-1}$);

said reconstructed three-dimensional stream comprising said received first view ($Vdec_0, V_0$) and said (k−1) reconstructed views ($Vdec_1, \ldots Vdec_{k-1}, V_1, \ldots, V_{k-1}$).

* * * * *